(12) United States Patent
Masuda et al.

(10) Patent No.: US 8,089,746 B2
(45) Date of Patent: Jan. 3, 2012

(54) MICROPOROUS FILM FOR ELECTRIC STORAGE DEVICE SEPARATOR AND ELECTRIC STORAGE DEVICE SEPARATOR USING THE SAME

(75) Inventors: Jun'ichi Masuda, Otsu (JP); Masatoshi Ohkura, Otsu (JP); Shigeru Tanaka, Otsu (JP); Hajime Fukushima, Otsu (JP)

(73) Assignee: TORAY Industries, Inc., Tokyo (JP)

( * ) Notice: Subject to any disclaimer, the term of this patent is extended or adjusted under 35 U.S.C. 154(b) by 866 days.

(21) Appl. No.: 12/083,729

(22) PCT Filed: Sep. 29, 2006

(86) PCT No.: PCT/JP2006/319408
§ 371 (c)(1),
(2), (4) Date: Apr. 17, 2008

(87) PCT Pub. No.: WO2007/046226
PCT Pub. Date: Apr. 26, 2007

(65) Prior Publication Data
US 2009/0219672 A1   Sep. 3, 2009

(30) Foreign Application Priority Data
Oct. 18, 2005   (JP) ................................. 2005-302718

(51) Int. Cl.
*H01G 9/00*   (2006.01)
(52) U.S. Cl. ........ 361/502; 361/503; 361/504; 361/509; 361/512; 361/525
(58) Field of Classification Search .................. 361/502, 361/303–305, 503–504, 509–511, 523–529, 361/512, 516–519
See application file for complete search history.

(56) References Cited

U.S. PATENT DOCUMENTS

| | | | |
|---|---|---|---|
| 3,382,306 A | 5/1968 | Oppenlander | |
| 4,849,311 A | 7/1989 | Itoh et al. | 429/192 |
| 5,071,645 A | 12/1991 | Johnson et al. | 424/486 |
| 5,134,174 A * | 7/1992 | Xu et al. | 521/143 |
| 5,173,235 A * | 12/1992 | Kamei et al. | 264/154 |
| 5,317,035 A | 5/1994 | Jacoby et al. | 521/143 |

(Continued)

FOREIGN PATENT DOCUMENTS

CN   1294608 A   5/2001

(Continued)

OTHER PUBLICATIONS

H. Dragaun et al., "Shear-Induced β-Form Crystallization in Isotactic Polypropylene", Journal of Polymer Science, Polymer Physics Edition, vol. 15, pp. 1779-1789 (1977), May 16, 1977.

(Continued)

*Primary Examiner* — Nguyen T Ha
(74) *Attorney, Agent, or Firm* — Kubovcik & Kubovcik

(57) ABSTRACT

There are provided a microporous film for an electric storage device separator, which can increase energy density and power density when used in an electric storage device, and which is excellent in handling properties in a processing step to the electric storage device, as well as an electric storage device separator and an electric storage device, using the microporous film. Specifically, provided is a microporous film for an electric storage device separator, characterized by including a porosity of 70% or more, a strength of 40 MPa or more in a longitudinal direction, an average pore size of from 40 to 400 nm, anuclear pores, and exhibiting biaxial orientation.

12 Claims, 4 Drawing Sheets

U.S. PATENT DOCUMENTS

| | | | |
|---|---|---|---|
| 6,245,272 B1 | 6/2001 | Takita et al. | 264/210.4 |
| 6,596,814 B2 | 7/2003 | Kim et al. | 525/191 |

FOREIGN PATENT DOCUMENTS

| | | | |
|---|---|---|---|
| CN | 1525907 A | 9/2004 |
| EP | 0 765 900 A1 | 4/1997 |
| EP | 0 842 758 A2 | 5/1998 |
| EP | 1 097 962 A1 | 5/2001 |
| EP | 1 369 221 A1 | 12/2003 |
| GB | 2 251 205 A | 7/1992 |
| JP | 55-032531 B1 | 8/1980 |
| JP | 55-131028 A | 10/1980 |
| JP | 57-203520 A | 12/1982 |
| JP | 06-325747 A | 11/1994 |
| JP | 07-118429 A | 5/1995 |
| JP | 07-84502 B2 | 9/1995 |
| JP | 25-09030 B2 | 4/1996 |
| JP | 10-258462 A | 9/1998 |
| JP | 10-296839 A | 11/1998 |
| JP | 11-086909 A | 3/1999 |
| JP | 11-302434 A | 11/1999 |
| JP | 2000-030683 A | 1/2000 |
| JP | 2000-212322 A | 8/2000 |
| JP | 2000-212323 A | 8/2000 |
| JP | 2001-002826 A | 1/2001 |
| JP | 3243835 B2 | 10/2001 |
| JP | 3443934 B2 | 6/2003 |
| JP | 3523404 | 2/2004 |
| JP | 2005-171230 A | 6/2005 |
| WO | 02/066233 A1 | 8/2002 |

OTHER PUBLICATIONS

H. Adachi et sl. "Evaluation of Characteristics of Separator for Lithium Ion Battery", Chemical Industry, vol. 47, pp. 47-52, 1996.

Wei Zhu et al., "A Novel Polypropylene Microporous Film", Polymers for Advanced Technologies, vol. 7, pp. 743-748, 1996.

M. Fjiyama, "Roughening Biaxially-drawn Polypropylene Film", Polymer Applications, vol. 38, pp. 35-41, 1989.

* cited by examiner

MICROPOROUS FILM FOR ELECTRIC STORAGE DEVICE SEPARATOR AND ELECTRIC STORAGE DEVICE SEPARATOR USING THE SAME

This application is a 371 of international application PCT/JP2006/319408 filed Sep. 29, 2006, which claims priority based on Japanese patent application No. 2005-302718 filed Oct. 18, 2005, which is incorporated herein by reference.

TECHNICAL FIELD

The present invention relates to a microporous film for an electric storage device separator suitable to a variety of electric storage devices represented by a lithium ion cell. Specifically, the invention relates to a microporous film for an electric storage device separator, which is extremely high in porosity and also excellent in permeability, and which increases the energy density and the power density of an electric storage device when the film is as a separator, as compared with a microporous film for a conventional electric storage device separator. In addition, the invention relates to a microporous film for an electric storage device separator in which its high porosity is well balanced with the strength of a longitudinal direction and which is excellent in handling properties when the film is processed as a separator of an electric storage device. Moreover, the invention relates to an electric storage device, due to its features, having a high energy density and a high powder density by use of the microporous film as a separator as compared with a conventional electric storage device.

BACKGROUND ART

An electric storage device is an extremely important electric device that supports today's ubiquitous society due to its feature of taking out electric energy at any place and time when necessary. On the other hand, with the spread of portable devices such as video cameras, personal computers, cellular phones, potable music players and portable game devices, high capacities and miniaturization for electric storage devices (particularly, secondary cells) have been strongly required year after year. Of these, a lithium ion cell is high in energy density and high in power density per volume and per mass as compared with other electric storage devices, so its demands are increasing greatly as am electric storage devices satisfying the above-described needs.

Furthermore, recent global warming, atmospheric pollution, the exhaustion of oils, $CO_2$ emission regulations, etc. raise issues, so an environmental load of automobiles is becoming a large problem. Thus, electric vehicles (EV), hybrid electric vehicles (HEV), fuel cell vehicles (FCV), etc. have been enthusiastically studied for development and practical application that can be one of the solutions for environmental measures (improvement of cleanliness), energy saving measures (improvement of fuel consumption), the next generation fuel measures (new energy development), etc. Attention has been paid, for example, to lithium ion cells, electric double-layer capacitors, and the like as their main power sources or auxiliary power sources, and their speedy applications have been studied.

Here, lithium ion cells generally have shapes such as cylindrical, angular, coin-like and laminate shapes. The insides of these cells have a construction in which an anode, a cathode, and a separator that is placed so as to separate the electrodes are spirally wound (wound type or spiral type), a construction in which alternate sheets of them are laminated or its similar construction (laminate type, stack type).

With an increasing demand for the above described electric storage devices and further needs for performance improvement, properties required for a separator making up an electric storage device are becoming a higher level.

Here, properties needed for a separator for the above lithium ion cell, as also described in Patent Document 13 below, primarily include separation properties, cell producibility, cell properties and the like.

Separation property is the most basic property needed for separators which requires that an anode is electrically separated from a cathode without short circuit and also the separator has ion permeability in a state impregnated with an electrolyte solution, further that the separator is inactive in electrochemical reaction environments (chemical resistance, oxidation and reduction resistances), and the like. In particular, for the prevention of the short circuit of an anode and a cathode, a separator is important to have no pin holes and no cracks.

Next, cell producibility is needed in particular when it is applied to wound type cells. In a step of winding a cell, electrodes are laminated to a separator to be made to wind them in a spiral form at a high speed. At this time, although the electrodes have concaves and convexes and may generate peeled materials during high speed winding, the separator wound at the high speed is required for not being broken due to the above concaves and convexes or the peeled materials, thereby not generating insulation failure of the cell. In other words, a high puncture strength is important for a separator. In addition, even in the cases other than a winding type, when the strength in the longitudinal direction (=lengthwise direction, flow direction, MD) is weak when spreading and winding of a separator including other steps of producing a cell, the film is elongated, wrinkled or broken in some cases (a person skilled in the art, when the phenomena are seen, regards the separator as being inferior in step passability, secondary processability or handling properties). Accordingly, the strength in a longitudinal direction also needs to be high. Like this, separators are important to be excellent in mechanical physical properties.

Cell properties require that current properties represented by charge and discharge performances at a large current (rate properties), charge and discharge performances at low temperature, and the like are excellent, that repeating of charge and discharge over a long period of time is possible (cycle properties), that a cell capacity can be maintained at high temperature (heat resistance), further that thermal runaway along with a rise in cell temperature due to overcharge or the like can be prevented (current shielding) (shutdown mechanism), and the like. Low internal resistance of a cell is important for improvement of rate properties, and when a same electrolyte solution is used, the thinner the separator, the higher the porosity, the larger the pore size, or the smaller the flexibility of the pore structure, the smaller the resistance tends to be. The selection of active materials for an anode and a cathode, and the construction inside a cell for improvement of loading density and the like are also important for cycle properties and heat resistance, and rare clogging of decomposed materials of an electrolyte solution in the surface opening of a separator, maintenance of an electrolyte solution poured into a separator, heat resistance of a separator itself, and the like are also important for cycle properties and heat resistance. The shutdown mechanism is a safety device of a cell, and importantly instantaneously melts and pore-encloses a separator at the time of temperature rise along with a runaway reaction to completely shutdown current and also importantly forms a continuous layer without breaking the separator to as high a temperature as possible after pore enclosure to continuously shutdown the current.

Because of these demand properties, presently, the separator for lithium ion cells primarily uses a chemically stable polyolefin microporous film represented by polyethylene or polypropylene.

The methods of forming pores of a microporous polyolefin film are generally roughly classified into a wet method and a dry method. The wet methods include an extraction technique that involves adding an extract to be extracted to polyolefin and finely dispersing and making a sheet and then extracting the extract to be extracted with a solvent or the like to form pores and, as required, having a step of carrying out stretching processing before and/after extraction, and the like (e.g., see Patent Document 1). The dry methods include a lamellae-stretching technique that involves carrying out low-temperature extrusion at the time of making a sheet by melt extrusion, and producing a non-stretched sheet having formed therein a special crystalline lamellae structure by taking high-draft, special melt crystallization conditions, and then primarily uniaxially stretching it to separate the stacked lamellae to form pores (e.g., see Patent Document 2, Non-patent Document 1). In addition, other dry methods include an inorganic particle technique that involves stretching a non-stretched sheet produced by addition in quantities of non-miscible particles such as inorganic particles to polyolefin to peel different material interfaces and form pores (e.g., see Patent Document 3). The others include a β-crystal technique that involves forming a low crystal density β crystal (crystal density: 0.922 g/cm$^3$) during the production of a non-stretched sheet by melt extrusion of polypropylene, and stretching it to transit the crystal to a high crystal density α crystal (crystal density: 0.936 g/cm$^3$) to form pores by means of the crystal density difference of the both (e.g., see Patent Documents 4 to 9, Non-patent Document 2).

The above β-crystal technique forms a large numbers of pores in a film after stretching, so a large amount of β crystal needs to be selectively formed in a non-stretched sheet prior to stretching. Because of this, the β-crystal technique uses a β crystal nucleating agent and importantly generates β crystal under specific melt crystallization conditions. Recently, a material having still higher β crystal formation capacity (e.g., see Patent Documents 10 and 11) is proposed as a β crystal nucleating agent as compared with a quinacridone compound used so far (e.g., see Non-patent Document 3), and a variety of microporous polypropylene films are proposed.

In addition, a method of producing a resin composition, a film or a pore-bearing film that contains 0.01 to 10 weight % of ultra high molecular weight polyethylene or polytetrafluoroethylene, has a β crystal content (K value) of 0.5 or more using an X ray and has a melt strength (MS) of 5 cN or more measured at 230° C., and other methods are also proposed (see Patent Document 12) for the purpose of improvement of low-temperature film producibility and thickness irregularity of a microporous polypropylene film produced by means of the β-crystal technique.

Further, many separators using a microporous polyethylene films are proposed that include, in addition to the above, for example, a polyolefin microporous film in which its average pore size and an average pore size of at least one surface thereof are in specific ranges and a separator for lithium ion cells constituted by it (see Patent Document 13), a polyolefin microporous film having a compression distortion factor and a puncture strength in specific ranges and a separator for lithium ion cells constituted by it (see Patent Document 14), a porous film including a polyolefin resin and having a pore structure parameter and a tensile strength in specific ranges and a separator for lithium ion cells constituted by it (see Patent Document 15), a cell separator containing a polypropylene microporous film which is produced from a precursor containing a beta nucleus and which has an electric resistance and a fracture strength in specific ranges (e.g., see Patent Document 16), and the like.

Patent Document 1: Japanese Patent No. 1299979 (claim 1)
Patent Document 2: Japanese Patent No. 1046436 (claim 1)
Patent Document 3: Japanese Patent No. 1638935 (claims 1 to 7)
Patent Document 4: Japanese Patent No. 2509030 (claims 1 to 8)
Patent Document 5: Japanese Patent No. 3443934 (claims 1 to 5)
Patent Document 6: Japanese Patent Laid-Open No. 7-118429 (claims 1 to 3, Examples 1 to 9)
Patent Document 7: Japanese Patent No. 3523404 (claim 1)
Patent Document 8: International Publication No. 02/66233
Patent Document 9: Japanese Patent Laid-Open No. 2005-171230 (claims 1 to 18, Examples 1 to 8)
Patent Document 10: Japanese Patent No. 2055797 (claims 1 to 8)
Patent Document 11: Japanese Patent No. 3243835 (claim 1)
Patent Document 12: U.S. Pat. No. 6,596,814 (claims 1 to 31, p. 2 paragraph 1, lines 18 to 50, Examples 1 to 3, Comparative Example 4)
Patent Document 13: Japanese Patent Laid-Open No. 2000-212323 (claims 1 to 3, Prior Art)
Patent Document 14: Japanese Patent Laid-Open No. 2000-212322 (claims 1 to 3)
Patent Document 15: Japanese Patent Laid-Open No. 2001-2826 (claims 1 to 8, Prior Art)
Patent Document 16: Japanese Patent Laid-Open No. 2000-30683 (claims 1 to 12, Examples 1 to 10)
Non-patent Document 1: Adachi et al., "Chemical Industry," Volume. 47, 1997, pp. 47-52,
Non-patent Document 2: M. Xu et al., "Polymers for Advanced Technologies", Volume 7, 1996, pp. 743-748
Non-Patent Document 3: Fujiyama, "Polymer Applications," Volume. 38, 1989, pp. 35-41

DISCLOSURE OF THE INVENTION

Problems to be Solved by the Invention

With increasing need for the above described high performance, the electric storage device separators or microporous films to be used for them are needing for large porosities and film thinning for the improvement of cell properties. For example, electric storage devices produced without being wound such as laminate type lithium ion cells do not always need high puncture strengths and thus low porosities, but rather may need an electric storage device separator having high porosities and excellent handling properties.

However, conventional microporous films or electric storage device separators using them of the above described Patent Documents 1 to 9 and 12 to 16 are substantially excellent in puncture strength, but have porosities of roughly from 50 to 60%, which are not so high, and are inferior in permeation performance, and thus do not remarkably improve cell properties. Moreover, it is difficult to produce separators with high porosities with good productivity. For instance, Patent Document 6 discloses microporous films produced by means of a β-crystal technique (e.g., Example 2), but the films exhibit low reproducibility and low strengths in longitudinal directions, thereby being inferior in handling properties.

In addition, a microporous polypropylene film disclosed Patent Document 9 causes problems in that the film worsens yield during production of electric storage devices, increases the internal resistance of an electric storage device to worsen its quality, and the like, since a non-miscible resin to be added to the film drops in a step of processing to an electric storage device or after the fabrication of an electric storage device, or dissolves in an electrolyte solution.

The present invention is done for primarily solving the above problem and its object is to provide a microporous film for an electric storage device separator capable of enhancing the cell property of the electric storage device using as a separator a film that rarely contaminates steps due to components making up the film and is extremely high in porosity, excellent in handling properties and permeability as well, as compared with a conventional microporous film for electric storage device separators, an electric storage device separator using the film and an electric storage device using the separator.

Means for Solving the Problems

The present inventors have diligently studied and found that the composition below can primarily solve the above problems.

In other words, a microporous film for an electric storage device separator of the present invention is characterized by primarily having a porosity of 70% or more, a strength of 40 MPa or more in its longitudinal direction, an average pore size of from 40 to 400 nm, anuclear pores, and exhibiting biaxial orientation.

Additionally, a preferred aspect of a microporous film for the electric storage device separator is characterized by having polypropylene as a primary component, having β-crystal activity, satisfying the equation below:

$$0.5 \leq I(MD)/I(TD) \leq 8 \quad (1)$$

wherein I(MD) is an integration intensity in a longitudinal direction and I(TD) is an integration intensity in a transverse direction, in an azimuthal intensity distribution profile in the plane of film of the (−113) face by means of X-ray diffraction, and having the Gurley permeability of 400 sec/100 m or less.

Moreover, an electric storage device separator using the microporous film is preferred, an electric storage device including the electric storage device separator, an anode, a cathode and an electrolyte solution is preferred, and the electric storage device preferably includes a lithium ion cell, an electrolyte condenser, and an electric double layer capacitor.

Effect of the Invention

A microporous film for an electronic device separator of the present invention is extremely high in porosity and high permeability as compared with conventional microporous films, so the energy density and the power density of an electric storage device using the film as a separator can be improved. In addition, although the porosity is high, the strength in a longitudinal direction is high, so that in a processing step to an electric storage device using the film as a separator, the film is not stretched, wrinkled or broken, and is excellent in handling properties. Additionally, as required, the separator itself can be made thin while keeping handling properties. This makes it possible to the capacity of the electric storage device to be improved. In this way, a microporous film for an electronic device separator of the present invention can be widely used, not as an auxiliary material of an electric storage device, but a film for a high performance separator contributable to positively making an electric storage device higher performance.

BRIEF DESCRIPTION OF THE DRAWINGS

in FIG. 1 and a heat of fusion (ΔHα) calculated from the area of an endothermic peak with melting of a crystal derived from polypropylene except a β crystal, in which the top is observed at 160° C. or higher.

DESCRIPTION OF THE SYMBOLS

Figure 1:
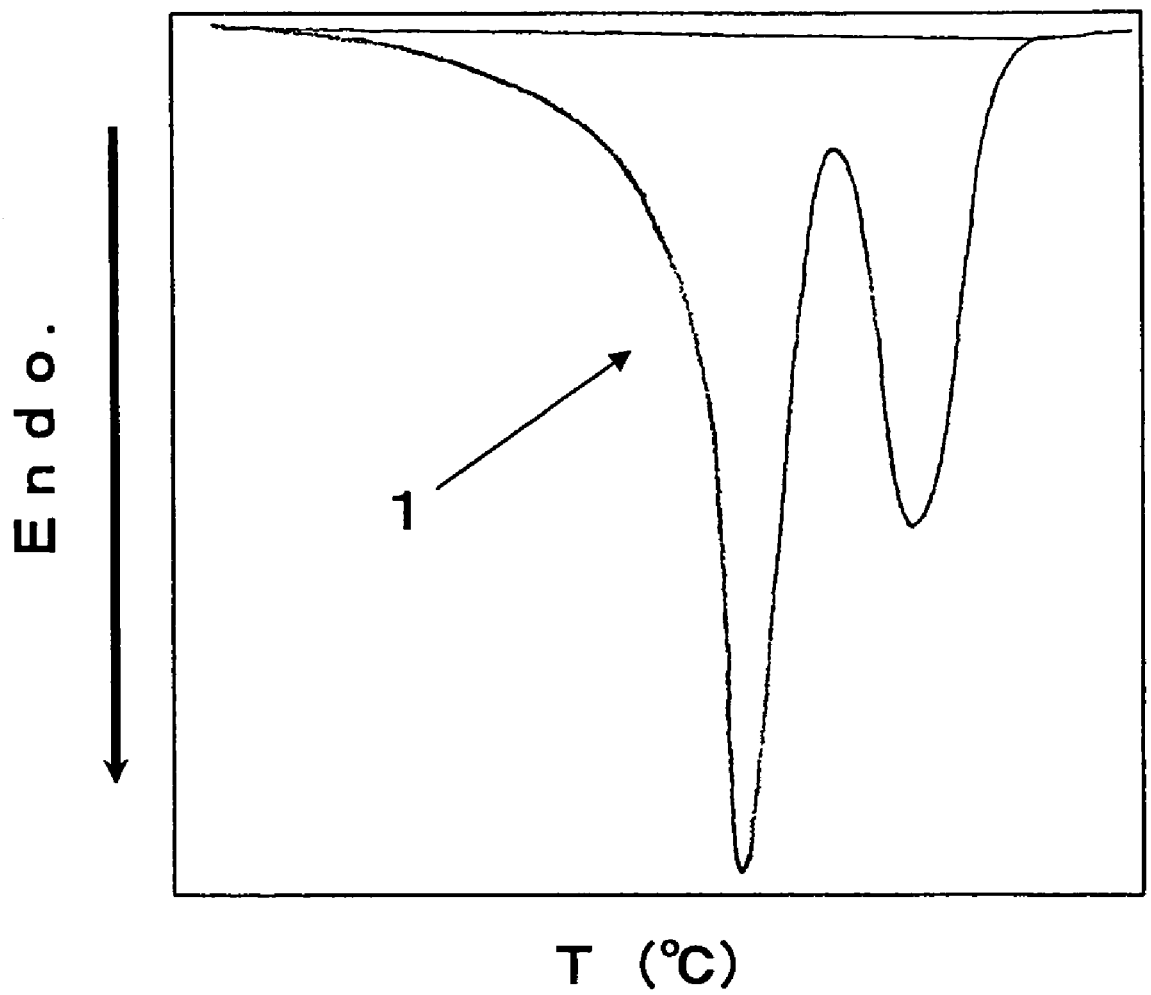
FIG. 1 is a diagram schematically indicating a calorie curve obtained when a β-crystal content depicted in the above measuring method (13) is evaluated by means of a differential scanning calorimeter (DSC).

| | |
|---|---|
| 1 | Calorie curve of a polypropylene film having β-crystal activity |
| 2 | Heat of fusion (ΔHβ) of a β crystal |
| 3 | Heat of fusion (ΔHα) of a crystal derived from polypropylene except a β crystal |
| 4 | Sample |
| 5 | Normal line relative to the film surface of a sample |
| 6 | Incidence X-ray |
| 7 | Diffraction X-ray |
| 8 | Goniometer axis (diffractometer axis) |
| 9 | Rotation flat face when a sample rotates in an azimuthal (β) direction |
| 10 | Observation point |
| 11 | X-ray radiation portion |
| 12 | Longitudinal direction of a sample |
| T | Temperature |
| Endo. | Endothermic direction |

BEST MODE FOR CARRYING OUT THE INVENTION

The porosity of a microporous film for an electric storage device separator of the present invention is 70% or more. It is substantially impossible for a conventional microporous film for an electric storage device separator to achieve such a high porosity, or the film is very difficult to maintain other demand properties and productivity. For example, in the case of a microporous polypropylene film produced by means of the β-crystal technique, the upper limit of a porosity to be achievable is roughly 60%. Here, an extremely high porosity corresponds to pores being formed compactly and in large quantities. The fact that the porosity of a microporous film for an electric storage device separator of the present invention is in the above range not only enables the permeability to be extremely enhanced, also an electrolyte solution to be spontaneously poured in its electric storage device fabrication step and also a larger amount of an electrolyte solution to be kept.

In addition, the above fact enables the film to be excellent in subsequent maintenance and the like of the electrolyte solution. Moreover, the above fact, when the film is used, for example, for a separator of a lithium ion secondary cell, enables a cell with a high energy density and a high capacity density to be fabricated, enables the internal resistance of a cell to be low, and enables the power density to be improved. In this manner, a microporous film for an electric storage device separator of the present invention has a high porosity and thus can be used not only as an auxiliary material for electric storage devices, but as a separator capable of positively contributing to higher performance of electric storage devices.

For the control of the porosity of a microporous film for an electric storage device separator of the present invention in the above range, in the case where the film is a microporous propylene film produced by means of the β-crystal technique, for example, doing it in the following is preferred. That is to say, importantly, the film is made to have β-crystal activity, more preferably the amount of addition of a β-crystal nucleating agent is suitable, still more preferably the amount of addition of it is from 0.05 to 0.2 weight %; HMS-PP is added, more preferably the amount of addition of it is made to be from 0.5 to 5 weight %; mVLDPE is added, more preferably the amount of addition of it is made to be from 1 to 10 weight %; the cast drum temperature is made to be from 110 to 125° C.; the contact time with a cast drum is made to be 8 sec or higher; in the case where the film is produced by a longitudinal-transverse sequential biaxial stretching method, the longitudinal stretching ratio is made to be from 5 to 10 times, the longitudinal stretching temperature is made to be from 95 to 120° C., the transverse stretching temperature is made to be from 130 to 150° C., the transverse stretching speed is made to be from 100 to 10,000%, more preferably less than 1,000%/min.

The porosity of a microporous film for an electric storage device separator of the present invention is more preferably 72% or more, still more preferably 73% or more, further more preferably 75% or more. In addition, in the present invention, the higher the porosity, the better the above effects tend to be; however, if it is too high, the film is frequently broken in its manufacturing step, and consequently film producibility is worsened or mechanical properties are excessively worsened. Thus, in a subsequent processing step to an electric storage device, the film is liable to be stretched or winkled, or broken (a person skilled in the art, when the phenomena are seen, regards the film as being inferior in step passability, secondary processability or handling properties), so the porosity is preferably 95% or less.

Next, the strength in a longitudinal direction of a microporous film for an electric storage device separator of the present invention is 40 MPa or more. In conventional electric storage device separators, when the porosity is made to be extremely high, mechanical properties such as film strength are damaged and it is extremely difficult to balance both the properties at high levels. In the present invention, the strength in a longitudinal direction of a film of the present invention being in the above range makes handling properties excellent without making the film stretched, wrinkled or broken, in a processing step to an electric storage device using a separator constituted by the microporous film.

The strength in a longitudinal direction of a microporous film for an electric storage device separator of the present invention is more preferably 45 MPa or more, still more preferably 45 MPa or more. In addition, in the present invention, the higher the strength in a longitudinal direction, the more excellent the above mentioned handling properties tend to be. However, when the strength is too high, in a processing step to an electric storage device, the film is excessively contracted in a transverse direction or is inferior in permeation performance, so the strength is 150 MPa or less, for example.

The strength of a microporous film for an electric storage device separator of the present invention, when the film is a microporous polypropylene film produced by means of the β-crystal technique, will be done, for example, in the following. In other words, the strength can be controlled when the crystallinity of polypropylene (corresponding to II or the like) is high as indicated below, by the porosity, orientation states (orientation state within the film face), or the like of a microporous film obtained. Here, even in the same porosity, as the face orientation becomes high, the strength can be made high, so the control of the orientation state is important. The face orientation of the microporous film, for example when a film is produced by stretching in at least one direction in its film producing step, can be made high as the magnification is high or the film is under stretching conditions at low temperature. In particular, when a film is produced by the longitudinal-transverse sequential biaxial stretching method, for the purpose of the increase of the breaking strength, effectively, the magnification of longitudinal stretching is made high, more preferably from 5 to 10 times, or the temperature of longitudinal stretching is made low, more preferably from 95 to 110° C.

The average pore size of a microporous film for an electric storage device separator of the present invention is from 40 to 400 nm. Here, in the present invention, the average pore size is measured in accordance with a so-called bubble point method of JIS K 3832 (1990). In the present invention, because of the average pore size of a film being in the above range, the conductivity of lithium ions can be made well compatible with separation properties between an anode and a cathode (shielding of active materials, prevention of formation, growth and passing of deposits, electric insulation). As the average pore size, for example when the film is used as a separator of a lithium ion secondary cell device, is high, the power density can be made improved, the average pore size is more preferably from 43 to 400 nm, still more preferably from 45 to 400 nm. Moreover, a lower limit of being particularly 52 nm is preferred, further a lower limit of exceeding 55 nm is particularly preferred, and a lower limit of 60 nm or more is most preferred.

Here, in the case where the film is a microporous polypropylene film produced by means of the β-crystal technique, it is difficult to enlarge the average pore size. For example, when a microporous polypropylene film is produced by use of homopolypropylene as a starting material, it is extremely difficult to control such that the average pore size of a microporous film is 52 nm or more so long as the film is produced under standard conditions. In particular, it is difficult to remarkably increase the average pore size by only alteration of film producing conditions such as humidity or magnification. Additionally, although the addition of a resin incompatible with polypropylene makes it possible to enlarge the average pore size, it is difficult to meet the above range and also the resin may be taken off to contaminate the film producing step, or the pore structure of a film obtained may become ununiform. In the microporous polypropylene film of the present invention, for example as described below in detail, the addition of a resin incompatible with polypropylene (e.g., mVLDPE described below), capable of forming a uniform and compact pore structure and forming anuclear pores, makes it possible to meet the above range. According to the resin, for example, micro-dispersion of the resin in polypropylene promotes pore formation by interface peeling during stretching without forming bulky pores and also melting the resulting material in the production step enables anuclear pore formation in a film to be obtained. Furthermore, in the microporous polypropylene film of the present invention, the stretching speed in a stretching step in at least one direction as described below is made to be below 1,000%/min to thereby make the average pore size extremely large as well.

A microporous film for an electric storage device separator of the present invention needs a state of being biaxially oriented. A state of being biaxially oriented can impart toughness to a film, which is hardly torn in any directions. This makes it possible to rarely break the film in the processing step to an electric storage device using a separator constituted by the microporous film. Moreover, in the processing step to an electric storage device, a film is not contracted excessively in a transverse direction. The methods of making a microporous film biaxially oriented of the present invention include, for example, simultaneous biaxial stretching, sequential biaxial stretching, subsequent re-stretching and various biaxial stretching techniques.

A microporous film for an electric storage device of the present invention substantially has anuclear pores. Herein, an "anuclear pore" in the present invention is defined as a pore in which a nucleus for pore formation represented by a resin, a particle or the like that induces pore formation by stretching or the like is not observed in its inside. In such an anuclear pore, as described below, nothing is observed inside the pore when an ultrathin section of film is observed under a transmission electron microscope (TEM) under specified conditions. On the contrary, in a pore not corresponding to an anuclear pore, in an image of the above TEM observation, nuclei of sphere, fiber, amorphous, or other shapes are observed inside the pore. The phrase "having an anuclear pore" is defined, as indicated in a measuring method (4) below, as the case where the ratio of the total area of nuclei to the total observation field area (total area of the film) is 3% or less in the TEM observation image. In this case, the microporous film should have anuclear pores. At this time, even in the case where there are several holes having nuclei from a microscopic viewpoint, although there can possibly be the case where the above technique detects the film as having anuclear pores, the object of the present invention is attained if the ratio calculated by the present technique is within the above range.

A microporous film for an electric storage device separator of the present invention has anuclear pores, and thus does not depend on pore formation by utilization of nuclei, thereby being capable of a uniform and compact pore structure. In addition, there is no bulky void formed from a nucleus as a starting point, so the film is rarely torn. Herein, the phrase "a film is torn" refers to a phenomenon in which a film is torn to a plurality of pieces roughly parallel to its surface. Moreover, having anuclear pores, when an electric storage device uses a separator constituted by the microporous film, enables worsening of electric storage device properties attributable to a separator to be prevented without dropping and/or dissolving impurities possibly becoming the internal resistance of the electric storage device from the separator. For the purpose of a film having anuclear pores in this manner, it is important to add as little as possible different polymers or particles low in miscibility with or affinity for a main polymer making up the film. R described above is more preferably 2% or less, still more preferably 1% or less, substantially most preferably 0%.

Herein, in the present invention, an aspect below is preferably satisfied in order to balance the porosity with the strength to a high degree and to make a microporous film for an excellent electric storage device separator satisfying other requirements.

The resins including a microporous film for an electric storage device separator of the present invention include polyolefin resins, halogenated vinyl resins, polyester resins, polyamide resins, polyphenylene sulfide resins, polyimide resins and the like, but are not limited thereto so long as they contribute to advantages of the present invention, and may be, as appropriate, selected in order to impart to a microporous film of the present invention desired permeability, dimension stability, rigidity, chemical resistance, oxidation/reduction resistance, and the like. In short, the resins used for a microporous film for an electric storage device separator of the present invention may be selected, as appropriate, depending on purposes, and may include two or more kinds of resins. However, as indicated below, a microporous film obtained needs to have anuclear pores.

The monomer components making up the above polyolefin resin include, for example, ethylene, propylene, 1-butene, 1-pentene, 3-methylpentene-1,3-methyl-1-butene, 1-hexene, 4-methyl-1-pentene, 5-methyl-1-hexene, 1-pentene, 1-octene, 1-decene, 1-dodecene, 1-tetradecene, 1-hexadecene, 1-heptadecene, 1-octadecene, 1-eicocene, vinylcyclohexene, styrene, allylbenzene, cyclopentene, norbornene, 5-methyl-2-norbornene, and the like. The resins include at least two or more of the copolymers produced and selected from these single polymers and the above monomer components, and blends of these single polymers and the copolymers, and the like, but are not limited thereto. In addition to the above monomer components, the examples may include copolymers and graft polymers of vinyl alcohol, maleic anhydride, acrylic acid compounds and the like, but are not limited thereto.

The above halogenated vinyl resins include, for example, poly(vinylidene fluoride), poly(vinylidene chloride), polytetrafluoroethylene, and the like, but are not limited thereto.

The above polyester resins include, for example, polyesters having composition components having as main components a dicarboxylic acid component and a glycol component, and the like, but are not limited thereto.

Such dicarboxylic acid components can use aromatic dicarboxylic acids, aliphatic dicarboxylic acids, alicyclic dicarboxylic acids, and the like. The aromatic dicarboxylic acid components include, for example, terephthalic acid, isophthalic acid, phthalic acid, 1,4-naphthalene dicarboxylic acid, 1,5-naphthalene dicarboxylic acid, 2,6-naphthalene dicarboxylic acid, 4,4'-diphenyldicarboxylic acid, 4,4'-diphenylether dicarboxylic acid, 4,4'-diphenylsulfone dicarboxylic acid, 5-sodium sulfo isophthalic acid, phenylendane dicarboxylic acid, and the like. The aliphatic dicarboxylic acid components include, for example, succinic acid, adipic acid, suberic acid, sebacic acid, dodecadionic acid, dimmer acid, eicosane dionic acid, and the like. In addition, the alicyclic dicarboxylic acid components include, for example, 1,4-cyclohexane dicarboxylic acid, and the like. These acid components may be used alone or in combination of two or more species, and further oxy-acids such as hydroxybenzoic acid, and the like may be partially polymerized.

In addition, the glycol components that are used include, for example, ethylene glycol, 1,2-propanediol, 1,3-propanediol, neopentyl glycol, 1,3-butanediol, 1,4-butanediol, 1,5-pentanediol, 1,6-hexanediol, 1,2-cyclohexanedimethanol, 1,3-cyclohexanedimethanol, 1,4-cyclohexanedimethanol, spiroglycol, diethylene glycol, triethylene glycol, polyalkylene glycols, 2,2'-bis(4'-β-hydroxyethoxyphenyl) propane, and the like. Of these, ethylene glycol, 1,4- butanediol, 1,6-hexanediol, 1,4-cyclohexanedimethanol, spiroglycol, and the like are preferably used. These gklycol components may be used alone or in combination of two or more species.

Additionally, within the range of inhibiting the advantages of the present invention, for the purpose of improvement of moldability and operation properties of a film, with the above polyesters may be copolymerized with multifunctional compounds such as trimellitic acid, trimesic acid, pentaerythritol, trimethylol propane and glycerin, oxydicarboxylic acids such as p-oxybenzoic acid, and the like.

The above polyester resins that can be preferably used include copolymers of polyethylene terephthalate, ethylene terephthalate and ethylnene isophthalate, copolymers of polyethylene-2,6-naphthalate, polybutylene terephthalate, copolymers of butylene terephthalate and ethylene terephthalate, copolymers of butylene terephthalate and hexamethylene terephthalate, copolymers of hexamethylene terephthalate and 1,4-cyclohexanedimethylene terephthalate, ethylene terephthalate and ethylene-2,6-naphthalate, blends thereof, and the like, but are not limited thereto.

The above polyamide resins include, for example, nylon 6, nylon 66, nylon 610, nylon 11, nylon 12, polyethylene isophthalamide, polymethaxylene adipamide, poly(hexamethylene isophthalamide/terephthalamide), poly(hexamethylene terephthalamide/monomethylerephthalamide), copolymers of hexamethylene isophthalamide/terephthalamide and ε-caprolactam, copolymers of hexamethylene terephthalamide and hexamethylene adipamide, blends of at least two species or more selected therefrom, and the like, but are not limited thereto.

The above polyphenylene sulfide resins include, for example, (co)polymers including thio-1,4-phenylene of a repeat unit of 70 mol % or more, preferably 85 mol % or more, and the like, but are not limited thereto. The resin is obtained by reacting an alkali metal sulfide with a paradihalobenzene at high temperature in a polar solvent. More preferably, the resin is obtained by reacting sodium sulfide with paradichlorobenzene at 230 to 280° C. in an amide-based high-boiling-point solvent such as N-methyl-pyrolidone, as required, by addition of a polymerization assistant such as caustic alkali or an alkali metal salt of a carboxylic acid for the adjustment of the degree of polymerization.

The above polyimide resin is obtained, for example, by chemically or heat ring-closing a polyamide acid and then drying the resulting substance, the polyamic acid being obtained by polymerizing one or more compounds selected from aromatic diamine compounds illustrated by 4,4'-diaminodiphenyl ether and the like with one or more compounds selected from aromatic tetracarboxylic acid compounds illustrated by pyromellitic dianhydride and the like.

To a resin making up a microporous film for an electric storage device separator of the present invention may be added, depending on its purpose, various additives such as a flame retardant, a heat stabilizer, a weather resistant material, an antoxidant, an ultraviolet absorbing agent, a light stabilizer, a rustinhibitor, a copper inhibitor, an antistatic agent, a pigment, a plasticizer, a terminal closing agent and an organic lubricant, so long as the advantages of the present invention are increased.

In addition, a scrap film generated during production of a microporous film of the present invention and scrap films generated during production of other films may be blended with a resin making up a microporous film for an electric storage device separator of the present invention from the viewpoints of economic efficiency and the like within the range of not damaging the properties of the present invention, and used. However, as indicated below, a microporous film obtained needs to have anuclear pores.

A resin making up a microporous film for an electric storage device separator of the present invention preferably uses a polyolefin resin, from the viewpoints of heat resistance, control of shutdown temperature, formability, reduction in production costs, chemical resistance, oxidation/reduction resistance, and the like.

In particular, a microporous film for an electric storage device separator of the present invention particularly preferably has polypropylene as a main component. Having polypropylene as a main component refers to inclusion of 90 weight % or more of a propylene monomer with respect to the total amount of polymers making up the film. Having polypropylene as a main component leads to excellence in productivity and to excellence in heat resistance, formability, heat resistance, oxidation/reduction resistance, and the like in the electric storage device separator therefrom. Moreover, in an electric storage device assembling step, the film is excellent in wettability to an electrolyte solution, so the film is uniformly wetted to the electrolyte solution without spots, and thus may be excellent in subsequent liquid maintenance. Furthermore, having polypropylene as a main component makes it possible to use the β-crystal technique excellent in productivity and quality balance as shown below. In particular, in the case of use of the β-crystal technique, when the content of a propylene monomer is less than 90 weight %, the β crystal activity of a microporous film obtained becomes insufficient; as a result, the porosity may be lowered or permeation performance may become inferior. The content of a propylene monomer is more preferably 95 weight % or more, still more preferably 97 weight % or more, based on the total amount of all the monomers of the polymers constituting the film.

A preferred aspect for achievement of a high porosity and strength when polypropylene is used as a main component as described above will be described below.

"Polypropylene" according to the present invention preferably primarily includes a single polymer of propylene, but may include a polymer produced by copolymerizing propylene with a monomer excluding propylene or may be a blend of the copolymer with polypropylene, within the scope of the object of the present invention. However, as described above, a microporous film obtained needs to have anuclear pores. The monomers making up these copolymer components and blends include, for example, ethylene, 1-butene, 1-pentene, 3-methylpentene-1,3-methylbutene-1,1-hexene, 4-methylpentene-1,5-ethylhexene-1,1-octene, 1-decene, 1-dodecene, vinylcyclohexene, styrene, allylbenzene, cyclopentene, norbornene, 5-methyl-2-norbornene, acrylic acid and derivatives thereof, and the like, but are not limited thereto.

Even when having polypropylene as a main component, a microporous film for an electric storage device separator of the present invention preferably contains a high melt strength polypropylene (HMS-PP) as an important point for attaining a high porosity and strength. Inclusion of HMS-PP makes the film rarely break during stretching and film producibility excellent, as compared with conventional microporous polypropylene films, so even if the film is stretched in a longitudinal direction at low temperature and at high magnification the film can be stably formed without breaking the film by transverse stretching. In addition, this enables the area stretching ratio (=the product of the real stretching ratio in a longitudinal direction and the real stretching ratio in a transverse direction) to be high thereby promoting the pore formation, so the porosity can be made high as compared with conventional microporous polypropylene film. Moreover, even if the porosity is high, the longitudinal orientation of a molecular chain in the film can be made promoted and the mechanical properties in a longitudinal direction can be maintained. This is estimated to be because the inclusion of HMS-PP promotes the entanglement of tie molecules with each other of amorphous crystal phase penetrating a fine crystal in the system from the casting step, and then stretching stress is uniformly transferred to the entire system in the stretching step.

In general, the methods of obtaining HMS-PP are not particularly limited and the following methods are illustrated and are preferably used.
(1) Method of blending polypropylene containing high molecular weight components in large quantities.
(2) Method of blending oligomers and polymers, having a branched structure.
(3) Method of introducing a long branched chain structure in a polypropylene molecule described in Japanese Patent Laid-Open No. 62-121704.
(4) Method of producing a straight chain crystalline polypropylene in which the melt strength and the intrinsic viscosity and the crystallization temperature and the melting point satisfy respectively specific relations and the extraction residue ratio of boiled xylene is in a specified range without the introduction of a long branched chain, described in Japanese Patent No. 2869606.

HMS-PP used in the present invention is preferably a polypropylene having a long branched chain in the main-chain skeleton among the polypropylenes because the stability of melt extrusion, the effect of the above mentioned stable high-magnification stretching and high porosity making therewith, and the permeability improvement effect are large.

Herein, a polypropylene having a long branched chain in the main-chain skeleton is a polypropylene having a polypropylene branched from a polypropylene main-chain skeleton. The reason why the above mentioned large effects may be obtained in a polypropylene having a long branched chain in the main-chain skeleton is estimated to be that the long branched chain acts as a tie molecule quasi-crosslinking fine crystals with each other from a casting step and stretching stress is uniformly transferred to the entire system in a subsequent stretching step.

Specific examples of the polypropylene having a long branched chain in the main-chain skeleton include polypropylene available from Basell (type names: PF-814, PF-633, PF-611, SD-632, etc.), polypropylene available from Borealis (type names: WB130HMS, etc.), polypropylene available from Dow (type names: D114, D201, D206, etc.), and the like.

The amount of mixing of HMS-PP used in the present invention is not particularly limited and preferably from 0.1 to 50 weight % based on the total amount of polypropylene of the film, and an advantage is seen even in a small amount of addition. When the amount of mixing is less than the above range, film producibility, in particular when longitudinal-transverse sequential biaxial stretching is carried out, particularly the stretching property in a transverse direction when the film is stretched at a high magnification in a longitudinal direction is worsened in some cases (the film is broken in a transverse stretching step). In addition, the porosity may be lowered, or the permeability may be inferior. When the amount of mixing exceeds the above range, film producibility in the case where longitudinal-transverse sequential biaxial stretching is carried out, particularly the stretching property in a longitudinal direction when the film is stretched at a high magnification in a longitudinal direction is worsened in some cases (the film is broken in a longitudinal stretching step).

Additionally, the stable discharge property of a melt polymer during melt extrusion, impact resistance of a film, and the like may be worsened. Moreover, when the β-crystal technique is used, the β-crystal content is sometimes lowered more than required. The amount of mixing of HMS-PP is more preferably from 0.5 to 20 weight %, most preferably from 0.5 to 5 weight %, based on the total amount of polypropylene of the film.

When a microporous film for an electric storage device separator of the present invention has polypropylene as a main component, the melt flow rate (MFR) of the polypropylene is preferably from 1 to 30 g/10 min from the viewpoint of film producibility. When the MFR is less than the above range, there may be posed problems in that melt extrusion at low temperature becomes unstable, that the substitution of an extrusion starting material needs a long time, that a film with a uniform thickness is difficult to form, and that film producibility is worsened. When the MFR exceeds the above range, the landing point of a melt polymer on a metal drum is greatly varied when the melt polymer discharged from a slit-shaped die is cast into the metal drum in a casting step to form a film in a sheet form, so the disadvantages of the sheet waving and like occur, and when the β-crystal technique is used, the formation of a uniform β crystal in the non-stretched sheet becomes difficult, so the thickness irregularity of the resulting microporous film may be enlarged, or formation irregularity of pores may be increased. The MFR is preferably from 1 to 20 g/10 min.

When a microporous film for an electric storage device separator of the present invention has polypropylene as a main component, the isotactic pentad fraction (mmmm) of the polyethylene making up the film is preferably from 90 to 99.5%. When the isotactic pentad fraction is below the above range, the resulting electric storage device separator may be inferior in heat resistance, dimension stability, etc. In addition, when the isotactic pentad fraction exceeds the above range, the film cracks frequently occur in its manufacturing step; as a result, productivity may be worsened. The isotactic pentad fraction is more preferably from 92 to 99%, still more preferably from 93 to 99%.

When a microporous film for an electric storage device separator of the present invention has polypropylene as a main component, the isotactic index (II) of the polyethylene making up the film is preferably from 92 to 99.8%. When the II is less than the above range, the problems of the stiffness of the resulting film being lowered, the thermal shrinkage becoming large, and the like are caused in some cases. The higher the II, the better the rigidity and the dimension stability, etc. tend to be, but when the II exceeds the above range, the film producibility itself may be worsened. The II is more preferably from 94 to 99.5%, still more preferably from 96 to 99%.

When a microporous film for an electric storage device separator of the present invention has polypropylene as a main component, the polypropylene may contain at least one or more kinds of polymer(s) selected from polyolefin resins-except polypropylene that are non-miscible with polypropylene, but are finely dispersed in the polypropylene due to high affinity for polypropylene, from the viewpoint of pore forming assistance with peeling phenomena at different material interfaces. However, in this case also, as indicated above, the resulting microporous film needs to have anuclear pores. Like this, although the polypropylene substantially contains a resin non-miscible therewith, the inclusion of anuclear pores in the resulting film can be achieved by, for example, melting the resin in its manufacturing step. This makes the interface of, for example, polyethylene-the polyolefin resin become a starting point in an initial step (a longitudinal stretching step in the longitudinal-transverse sequential biaxial stretching) and promote pore formation and also melt the resin in the stretching step, so the drop of the resin in the manufacturing step may also prevent the contamination of the step. In this case, it is important to select as appropriate characteristics such as the melting point of the polyolefin resin. Moreover, the control of the dispersion size of the resin in a non-stretching sheet prior to stretching to be small becomes a key for promoting pore formation while maintaining a uniform and compact pore structure.

The polyolefin resins include homopolymers or copolymers constituted by olefins such as the monomers as illustrated above mainly except propylene, but are not limited thereto. The polyolefin resins include an ultra low density polyethylene (mVLDPE) produced by a metallocene catalyst method, and the like, because the polyethylene is non-miscible with polypropylene, but high affinity for polypropylene, and thus disperses in polypropylene in an ultra trace amount in the melt extrusion step, is improved in film producibility in a subsequent stretching step, and is promoted in pore formation and the resulting microporous film has anuclear pores and also is excellent in permeability, but are not limited thereto. Examples of the mVLDPE include "Engage" (type name: 8411, etc.) available from DuPont Dow Elastomers, and the like.

In addition, among resins non-miscible with polypropylene besides the ones described above, a resin in which most of the pores in the resulting microporous film have nuclei, (i.e. a resin that makes a resulting film have substantially no anuclear pores) when the resin is added in an effective amount, is preferably not added when a microporous film for an electric storage device separator of the present invention has polypropylene as a main component. Examples of these not preferred resins include, for example, polymethylpentene (PMP) and copolymers of methylpentene with α-olefins except methylpentene, cycloolefins alone or copolymers thereof (COC), polybutylene terephthalate (PBT), polycarbonate (PC), syndiotactic polystyrene (stPS), ultra high molecular weight polyethylene (UHMWPE), polytetrafluoroethylene (PTFE), liquid crystal resin (LCP), poly(methyl methacrylate) (PMMA), polyethylene terephthalate (PET), and the like. The resin has a large dispersion size in polypropylene and maintains its dispersion form in the polyethylene even in the film producing step, so the resulting microporous film has bulk voids formed therein as nuclei, thereby worsening the permeability and also worsening film producibility as well in some cases. In particular, when UHMWPE is used, gelled substance may precipitate during melt extrusion, so PTFE generates hydrofluoric acid due to the decomposition of the polymer and may possibly corrode the extruder or the die, and thus is not preferably used in the present invention.

Herein, when a microporous film of the present invention has polypropylene as a main component, that a resin to be added is non-miscible with polypropylene refers to meet the following requirements. In other words, as indicated in the measuring method below, it means that the average value of the dispersion diameter of the resin in a thickness direction dispersed in the polypropylene is 10 mm or more, when a sample of a microporous film produced by melt/compression molding is observed under a transmission electron microscope (TEM). When the dispersion diameter is below the above range, pore formation is not promoted, so a large addition advantage is not obtained in some cases. The dispersion diameter is more preferably 20 nm or more, still more preferably 40 nm or more. On the other hand, the dispersion diameter, when small, enables the pore size to be large and the porosity to be high while maintaining a homogeneous and compact pore structure, and thus tends to remarkably increase the permeability. Therefore, the dispersion diameter is preferably 400 nm or less, still preferably 300 nm or less.

One important point for attaining a high porosity and a high strength when propylene is a main component is preferably that a microporous film for an electron storage device separator of the present invention preferably has β crystal activity. Having β crystal activity makes it possible to a β crystal in a non-stretched sheet in its manufacturing step and makes the β crystal crystal-transfer to an α crystal in a subsequent stretching step and its crystal density difference leads to be able to form pores. In addition, the β-crystal technique is originally a dry method, and thus does not need a complicated process different from other techniques, thereby being capable of inexpensively providing a microporous polypropylene film having excellent characteristics. In the case where a microporous film of the present invention does not have β crystal activity, the β-crystal technique characteristic for polypropylene cannot be used. For attainment of a high porosity, introduction of nuclei into most of the resulting film and thus making an aspect not having anuclear pores is needed, making uniaxial orientation is needed, or the use of an extraction method of using a solvent is needed, so the above case is inferior from the viewpoint of productivity and environmental loading and the resulting microporous film is inferior in permeability in some cases.

Herein, the phrase "having β crystal activity" means that when polypropylene is crystallized, a β crystal is formed. In the present invention, this can be ascertained in the following. In other words, the phrase means that 5 mg of a sample is heated to 280° C. at a speed of 10° C./min in a nitrogen atmosphere by means of a differential scanning calorimeter (DSC) in accordance with JIS K 7122 (1987), and then is maintained for minutes, and then cooled to 30° C. at a cooling speed of 10° C./min, and then kept for 5 minutes and its temperature is increased again at a speed of 10° C./min and in a caloric curve obtained during the above operations there is present an endothermic peak with melting of a β crystal at 140 to 160° C. and the heat of fusion calculated from the peak area of the endothermic peak is 10 mJ/mg or more. Hereinafter, the caloric curve obtained in the first temperature raise may be called a first run caloric curve, and the caloric curve obtained in the second temperature raise may be called a second run caloric curve.

In addition, the ascertainment of the formation capability of the β crystal of polypropylene by use of DSC is also disclosed in Cho et al., "Polymer," 44, pp. 4053 to 4059 (2003); Takahashi et al., "Seikei-Kakou," 15, pp. 756 to 762 (2003); etc. In these documents, near the above temperature conditions, a caloric curve is constructed using DSC and the β crystal activity of polypropylene containing a β crystal nucleating agent is ascertained. Additionally, the judgment of β crystal activity here is done by measuring a film after extrusion, casting, stretching, rolling-up steps and thus after film production. Hence, when the polypropylene of a film contains β crystal nucleating agent illustrated below, β-crystal activity is judged for the entire film containing a β crystal nucleating agent exhibits.

Now, in the case of being uncertain whether or not the presence of an endothermic peak in the above temperature range is attributable to the melting of a β crystal, the sample is melt-crystallized under the specific conditions described in (6) of the measuring method below and evaluated using a wide angle X-ray diffraction method along with the results of DSC and then it may be decided whether or not "having β-crystal activity" is sure on the basis of the K value below to be calculated. In other words, from the diffraction peak intensity (set to be $H\beta_1$) of the face (300) attributable to a β crystal observed near $2\theta=16°$ and the diffraction peak intensities (set to be $H\alpha_1$, $H\alpha_2$, and $H\alpha_3$, respectively) of the faces (110), (040) and (130) attributable to a α crystal observed near $2\theta=14, 17,$ and $19°$, respectively, and when the K value calculated from the equation below is 0.3 or more, more preferably 0.5 or more, it may be judged that the film "has β-crystal activity." Here, the K value is an empirical value indicating the ratio of a β crystal. The details of the K Value such as a calculation method of each diffraction peak intensity may be referred to A. Turner Jones, et al., "Makromolekulare Chemie), 75, pp. 134-158 (1964).

$$K=H\beta_1/\{H\beta_1+(H\alpha_1+H\alpha_2+H\alpha_3)\}$$

wherein $H\beta_1$ is the diffraction peak intensity of the face (300) attributable to a β crystal of polypropylene, $H\alpha_1$, $H\alpha_2$ and $H\alpha_3$ are, respectively, the diffraction peak intensities of the faces (110), (040) and (130) attributable to a α crystal of polypropylene.

Here, for the formation of more uniform and more pores, the β crystal content of the above microporous film is preferably 30% or more. In addition, the β crystal content is calculated using the equation below from, as described above, in a caloric curve of the second run obtained in the second temperature raise by means of DSC, a heat of fusion (ΔHβ: the symbol 2 of FIG. 2 equal to the same calorie curve as FIG. 1) calculated from the peak area of an endothermic peak (one or more peaks) with melting of a β crystal derived from polypropylene in which a peak is observed from 140° C. inclusive to 160° C. exclusive and a heat of fusion (ΔHα: the symbol 3 of FIG. 2 equal to the same calorie curve as FIG. 1) calculated from the peak area of an endothermic peak with melting of a crystal polyethylene except a β crystal having a peak exceeding the baseline with melting of a crystal derived from polypropylene except a β crystal in which a peak is observed at 160° C. or higher:

$$\beta\text{ crystal content (\%)}=\{\Delta H\beta/(\Delta H\beta+\Delta H\alpha)\}\times 100$$

wherein the β crystal content is the proportion of the β crystal to the entire crystal of polypropylene, and in Japanese Patent Laid-Open No. 2004-142321 and, as described above, Japanese Patent Laid-Open No. 2005-171230, International Publication No. 02/66233, Japanese Patent Laid-Open No. 2000-30683, etc., a calorie curve is measured using DSC under temperature conditions near those of the present invention and the β crystal content of a film is calculated.

When the β crystal content is less than the above range, the porosity of the resulting microporous film may be lowered or the permeability may be inferior. The β crystal content is more preferably 40% or more, still more preferably 50% or more, most preferably 60% or more.

Additionally, in the case where there is an endothermic peak having the top at from 140 to 160° C., but it is uncertain whether or not the peak is attributable to the melting of a β crystal, or the like, judgment may be done using the above K value.

For the impartment of a high β crystal activity as described above, a so-called β crystal nucleating agent is preferably added to the polypropylene of a microporous film. When such a β crystal nucleating agent is not added, a high β crystal activity as described above is not obtained in some cases. The β crystal nucleating agents that can be preferably added to polypropylene making up a microporous film of the present invention include various substances such as iron oxides having a size of nanoscale; alkali or alkali earth metal salts of carboxylic acids represented by potassium 1,2-hydroxystearate, magnesium benzoate, magnesium succinate, magnesium phthalate and the like; amide compounds represented by N,N'-dicyclohexyl-2,6-naphthalene dicarboxamide and the like; aromatic sulfonic acid compounds represented by sodium benzenesulfonate, sodium naphthalenesulfonate and the like; di- or triesters of dienoic or trienoic acids; tetraoxaspiro chemical compounds; imide carboxylic acid derivatives; phthalocyanine-based pigments represented by phthalocyanine blue and the like; quinacridone-based pigments represented by quinacridone, quinacridone quinone and the like; two component compounds including components A of being organic dibasic acids and components B of being oxides, hydrides or salts of IIA metals in the Periodic Table; and the like, but are not limited thereto. In addition, one species may be used or two or more species may be used in a mixture.

Among them, (1) amide compounds expressed by the chemical formula below and represented by N,N'-dicyclohexyl-2,6-naphthalene dicarboxamide, and the like:

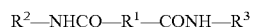

wherein $R^1$ represents a saturated or unsaturated aliphatic dicarboxylic acid residue having 1 to 24 carbon atoms, a saturated or unsaturated alicyclic dicarboxylic acid residue having 4 to 28 carbon atoms, or an aromatic dicarboxylic acid residue having 6 to 28 carbon atoms, $R^2$ and $R^3$ represent the same or different cycloalkyl groups having 3 to 18 carbon atoms, cycloalkenyl groups having 3 to 12 carbon atoms, or their derivatives;

(2) compounds having the chemical formula below:

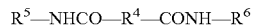

wherein $R^4$ represents a saturated or unsaturated aliphatic diamine residue having 1 to 24 carbon atoms, a saturated or unsaturated alicyclic diamine residue having 4 to 28 carbon atoms, a hetrocyclic diamine residue having 6 to 12 carbon atoms, or an aromatic diamine residue having 6 to 28 carbon atoms, $R^5$ and $R^6$ represent the same or different cycloalkyl groups having 3 to 12 carbon atoms, cycloalkenyl groups having 3 to 12 carbon atoms, or their derivatives;

(3) two component compounds including components of organic dienoic acids and components of oxides, hydrides or salts of IIA metals in the Periodic Table;

can increase the porosity of the resulting microporous film and improve the permeability, so they are particularly preferred.

Specifical examples of such particularly preferred β-crystal nucleating agent or β-crystal nucleating agent added polypropylene include the β-crystal nucleating agent "NJ Star" (type name: NU-100, etc.) available from New Japan Chemicals Co., Ltd., the β-crystal nucleating agent added polypropylene "BEPOL" (type name: B022-SP, etc.) available from SUNOCO, and the like.

The amount of addition of such β-crystal nucleating agent, depending on the β-crystal formation capacity of a β-crystal nucleating agent, is preferably from 0.001 to 1 weight % based on the total amount of the substances making up the film. When the amount of addition of a β-crystal nucleating agent is below the above range, the β-crystal activity of the resulting microporous film may become insufficient, the porosity may be lowered, or the permeation performance may be inferior. When the amount of addition of a β-crystal nucleating agent exceeds the above range, even if the agent is further added, the β-crystal content of the resulting microporous film is not improved and economical efficiency is inferior, so the dispersion property of the nucleating agent itself is worsened and the β-crystal activity may be decreased. The amount of addition of a β-crystal nucleating agent is more preferably from 0.005 to 0.5 weight %, still more preferably from 0.05 to 0.2 weight %.

Here, the above described β-crystal nucleating agent is preferably dispersed in a needle shape in a non-stretched sheet. The dispersion form of a nucleating agent, as described in the detailed description of the measuring method as described below, is observed for a non-stretched sheet under an optical microscope from the direction of the film face and at this time if the average value of the ratio of the length to the breadth, of the nucleating agent to be ascertained, (=length/breadth) is 10 or more, the nucleating agent is defined as being disperse in a needle shape. However, if a β-crystal nucleating agent dispersed in a microporous film in a needle shape can be ascertained, the β-crystal nucleating agent may be regarded as being dispersed in a needle shape in a non-stretched sheet. In this case, the microporous film is observed in the same manner, and if the average value of the ratio of the length to the breadth, of the nucleating agent ascertained at this time, is 10 or more, the nucleating agent can be said to be dispersed in a needle shape.

The dispersion of a β-crystal nucleating agent in a needle shape in a non-stretched sheet enables the porosity of the resulting microporous film to be improved and the permeability to be increased. For the purpose of dispersion of a β-crystal nucleating agent in a non-stretched sheet in a needle shape, although the β-crystal nucleating agent is preferably dispersed in advanced in a melting resin, in extrusion and casting steps, the nucleating agent dispersed in a needle shape at the time of melt extrusion tends to arrange in a longitudinal direction (the longitudinal direction of the nucleating agent tends to face the longitudinal direction of the non-stretched sheet), so the crystal lamellae itself of the non-stretched sheet obtained after casting further tends to orient. Because of the synergistic effect of this and a crystal transition from a β crystal to α crystal, it is estimated that the porosity of a microporous film is increased and the permeability is improved.

When having polypropylene as a main component, a microporous film for an electric storage device separator of the present invention may have mixed therewith, within the scope of not losing the object of the present invention, for example, a variety of additives such as an antioxidant, a heat stabilizer, a chlorine supplement, a charge preventing agent, an anti-blocking agent, a viscosity adjusting agent and a copper inhibitor. At this time, the β-crystal content of a microporous film obtained in the case of the addition is preferably in an object range.

When having polypropylene as a main component, so long as the film substantially has anuclear pores, a microporous film for an electric storage device separator of the present invention may have added thereto a variety of additives such as inorganic particles and/or crosslinking organic particles, for the purpose of slip property impartment and anti-blocking (anti-blocking agent). However, as described above, the resulting microporous film needs to have anuclear pores.

The inorganic particles are metal or metal compound inorganic particles and include, for example, particles such as zeolite, calcium carbonate, magnesium carbonate, alumina, silica, aluminum silicate, kaolin, kaolinite, talc, clay, diatom earth, montmorillonite and titanium oxide, or mixtures thereof, but are not limited thereto.

In addition, the crosslinked organic particles are particles produced by crosslinked a macromolecular compound using a crosslinking agent, and include, for example, crosslinked particles of polymethoxysilane compounds, crosslinked particles of polystyrene compounds, crosslinked particles of acrylic compounds, crosslinked particles of polyurethane compounds, crosslinked particles of polyester compounds, crosslinked particles of fluorine compounds, or mixtures thereof, and the like, but are not limited thereto.

Moreover, the volume average particle diameter of inorganic particles and crosslinked organic particles is preferably from 0.5 to 5 μm. When the volume average particle diameter is below the above range, the slip property of the resulting microporous film is sometimes inferior; when it exceeds the above range, the particles may be dropped. In addition, when the particles are added mainly for hole formation assistant purposes, the volume average particle diameter is preferably from 0.05 to 1 μm. When the volume average particle diameter is less than the above range, the addition advantage is not sometimes exhibited; when the volume average particle diameter exceeds the above range, the dropping of particles may be remarkable.

The amount of addition of inorganic particles and/or crosslinked organic particles is preferably from 0.02 to 0.5 weight %, more preferably from 0.02 to 0.5 weight %, based on the all the substances making up the film, the above-described range being preferred for excellent anti-blocking property and slip property impartment as well as having anuclear pores. Further, as described above, when the addition of particles decreases the β-crystal content or drops particles to be liable to contaminate the inside of steps, it is rather preferable that particles are not substantially added, and the amount of addition may be selected as appropriate.

When a microporous film for an electric storage device separator of the present invention has polypropylene as a main component, in a profile of the azimuthal angle (β) of the face (−113) by means of X-ray diffraction method, the following equation (1) is preferably satisfied.

$$0.5 \leq I(MD)/I(TD) \leq 8 \tag{1}$$

wherein I(MD) is the integration intensity in the longitudinal direction, and I(TD) is the integration intensity in the transverse direction.

Here, the face (−113) is α crystal lattice face containing a component in the molecular chain axis direction, obtained near 2θ=43°, in an X-ray diffraction profile obtained by 2θ/θ scanning. In addition, I(MD) and I(TD), as described in the measuring method (6) below, is an integration intensity calculated from a profile of an intensity distribution obtained when the positions of a sample and a counter are fixed to θ and 2θ in which the top of the diffraction peak of the above face (−113) and the sample is turned in the direction of an azimuthal angle (β) within the film face. If the volume of a sample irradiated with X ray relative to the direction of an azimuthal angle is constant in the same sample, the intensity distribution profile of the above (−113) in the direction of an azimuthal angle corresponds to the orientation distribution of the crystal chains within the film face. In other words, I(MD) corresponds to a component oriented to the longitudinal direction and I(TD) corresponds to a component oriented to the transverse direction, in crystal chains within the film face. For example, when I(TD) is sufficiently high as compared with I(MD), the crystal chains within the film face corresponds mainly to the transverse orientation. Thus, the magnitude of I(MD)/I(TD) is a measure of the extent to which the crystal chains within the film face are oriented in the longitudinal direction. In other words, in a film highly longitudinally oriented, I(MD)/I(TD) is high, and in a film mainly transversely oriented, I(MD)/I(TD) is inversely small. Additionally, for example, Masuda et al., "Convertech," 369, December issue, pp. 42-45 (2002) discuss the crystal chain orientation balance within the face of a biaxial stretched polypropylene film from the intensity distribution profile of the face (−113) in the direction of an azimuthal angle. Moreover, the face (−113) is, strictly speaking, not a meridional peak (a diffraction peak due to face intervals perpendicular to the molecular chain axis direction), so each intensity distribution may be slightly split in the intensity distribution profile of the above β direction. However, according to the above method, the orientation balance of crystal chains can be evaluated even in this aspect, and thus the method is said to be sufficient even in the present invention.

If I(MD)/I(TD) is less than the above range, in a processing step to an electric storage device using the microporous film as a separator, the film may be stretched, wrinkled, broken, or the like, so the handling properties may be inferior. On the other hand, the higher I(MD)/I(TD), the more excellent the mechanical physical properties in the longitudinal direction; if I(MD)/I(TD) exceeds the above range, the film is liable to be torn in the transverse direction or the productivity in its manufacturing step is worsened, and in the processing step to an electric storage device the film is excessively contracted in the transverse direction. Thus, I(MD)/I(TD) preferably satisfies, for example, the following equation (2), more preferably satisfies the following equation (3):

$$0.8 \leq I(MD)/I(TD) \leq 6 \qquad (2)$$

$$0.9 \leq I(MD)/I(TD) \leq 5 \qquad (3)$$

Making I(MD)/I(TD) such aspect can be attained, for example, by the selection of HMS-PP added to polypropylene making up a film and a β crystal nucleating agent and the control of its amount of addition, and in its manufacturing step the control of crystallization conditions when melt polymer is solidified in the casting step (metal drum temperature, the rotating speed of the metal drum, the thickness of the resulting non-stretched sheet, contact time with the metal drum, etc.) and stretching conditions in the stretching step (stretching directions (longitudinal or transverse), stretching modes (longitudinal or transverse uniaxial stretching, longitudinal-transverse or transverse-longitudinal sequential biaxial stretching, simultaneous biaxial stretching, re-stretching after biaxial stretching, etc.), stretching ratio, stretching speed, stretching temperature, etc.), etc., and the like. Of these, for the increase of I(MD)/I(TD), in the case of production of a film by stretching at least in one direction, stretching is effective at a high magnification in the longitudinal direction or at low temperature. In particular, in the case of production by means of a longitudinal-transverse sequential biaxial stretching method, preferably, the longitudinal stretching ratio is made from 5 to 10 times and the longitudinal stretching temperature is made from 95 to 110° C. At this time, the higher the longitudinal stretching ratio and the lower the longitudinal stretching temperature, stretching properties in transverse stretching subsequently carried out become unstable, so for example, preferably HMS-PP is added, more preferably its amount of addition is made from 0.1 to 50 weight %, still more preferably its amount of addition is made from 0.5 to 20 weight %, most preferably its amount of addition is made from 0.5 to 5 weight %; preferably mVLDPE is added, more preferably its amount of addition is made from 1 to 10 weight %.

Next, on at least one face of a microporous film for an electric storage device separator of the present invention, a variety of polymers may be laminated as appropriate, depending on a variety of purposes such as slip property impartment, increasing open-hole ratio on the surface, surface hydrophilicity impartment and surface heat resistance impartment, within the scope of not losing the object of the present invention. At this time, as before the lamination, a film obtained by lamination need to also substantially have permeability.

The methods of laminating such polymers include co-extrusion, in-line/off-line extrusion lamination, in-line/off-line coating, physical vapor deposition, chemical vapor deposition, sputtering, and the like, but are not limited to any of them, and may select the best method whenever necessary.

For example, a film of the present invention, for impartment of good slip properties and the improvement of handling properties while maintaining high permeability, may be preferably subjected to lamination of a variety of polymers containing a variety of lubricants, a variety of particles and a variety of sliding agents as skin layers at least on one side of the film.

Subjection of corona discharge treatment to at least one side of the film surfaces of a microporous film for an electric storage device separator of the present invention to thereby control the wettability of the film can be preferably adopted for the improvement of surface hydrophilicity, charge inhibiting properties and the like and the control of wettability of an electrolyte solution. At this time, as an atmospheric gas during corona discharge treatment is preferably air, oxygen, nitrogen, carbon dioxide gas, or a mixture of nitrogen and carbon dioxide gas, or the like, and from the viewpoint of economic efficiency the implementation of corona discharge treatment in the air is particularly preferred. In addition, flame treatment, plasma treatment and the like are also preferable from the viewpoint of surface wet tension control.

The thickness of a microporous film for an electric storage device separator of the present invention is preferably from 5 to 50 μm. When the thickness is below the above range, in a step of manufacturing the film and a subsequent processing step to an electric storage device, handling properties may be inferior in that the film may be stretched, wrinkled or the like. When the thickness exceeds the above range, the volume occupied by the separator within an electric storage device is larger than required, so the capacity of the electric storage device is sometimes lowered. The thickness of a microporous film of the present invention is more preferably from 7 to 40 μm, still more preferably from 8 to 35 μm, most preferably from 9 to 30 μm.

The Gurley permeability of a microporous film for an electric storage device separator of the present invention is preferably 400 sec/100 ml or less. The Gurley permeability, a measure of the permeability of a microporous film obtained, can be controlled, for example when the film has polypropylene as a main component and is subjected to the β-crystal technique, by the amount of addition of HMS-PP and a β crystal nucleating agent added to polypropylene making up a film, by, in its manufacturing step, crystallization conditions when melt polymer is solidified in the casting step (metal drum temperature, the rotating speed of the metal drum, the thickness of the resulting non-stretched sheet, contact time with the metal drum, etc.), by stretching conditions in the stretching step, and by the stretching modes (stretching ratio, stretching speed, stretching temperature, etc.), or by the like. Of these, for the production of a film excellent in permeability by the decrease of the Gurley permeability, for example, in the range of not causing worsened productivity due to film breakage or the like, particularly effective are the following: HMS-PP is added and, particularly as indicated below, a film is stretched at a high magnification in a longitudinal direction, more preferably its amount of addition is made to be from 1 to 10 weight %; mVLDPE is added, more preferably its amount of addition is made to be from 1 to 10 weight %; the temperature of the cast drum is made to be from 110 to 125° C.; the contact time with the cast drum is made to be 8 sec or more; in the case where a film is produced by longitudinal-transverse sequential biaxial stretching, the stretching ratio of a longitudinal direction is made from 5 to 8 times, the longitudinal stretching temperature is made to be from 95 to 120° C., the transverse stretching temperature is made to be from 130 to 150° C., the stretching speed in a transverse direction is made to be from 100 to 10,000%, more preferably below 1,000%/min; and the like. When the Gurley permeability exceeds the above range, the permeation performance is insufficient and also the porosity is lowered in some cases. In addition, in the present invention, the lower the Gurley permeability, the higher the power density of an electric storage device tends to be made, for example, when a film is used as a separator of a lithium ion secondary electric storage device. However, when the Gurley permeability is too low, a film is frequently broken in its manufacturing step; as a result, film producibility is worsened, and in a subsequent processing step to an electric storage device, handling properties may be inferior in that the film is stretched, wrinkled, or broken. Thus, the Gurley permeability is preferably, for example, 10 sec/100 ml or more. The Gurley permeability is more preferably from 10 to 350 sec/100 ml, most preferably from 20 to 250 sec/100 ml.

Although the production of a microporous film for an electric storage device separator of the present invention uses a variety of film producing methods represented by a variety of biaxial stretching methods such as simultaneous biaxial stretching, sequential biaxial stretching and subsequent re-stretching thereof, it particularly preferably uses the longitudinal-transverse sequential biaxial stretching method in order to achieve at a high level the objects of the present invention of biaxially orienting a film, highly balancing the porosity and the strength in a longitudinal direction and further producing a high permeation microporous film at high productivity. In addition, the longitudinal-transverse sequential biaxial stretching method is suitable from the viewpoints of scalability of the apparatus, etc. as compared with other manufacturing methods.

One example of a method of manufacturing a microporous film for an electric storage device of the present invention will be described below when the method uses the longitudinal-transverse sequential biaxial stretching method and the β-crystal technique, and when the film contains propylene as a main component.

For example, a polypropylene is prepared that contains HMS-PP and/or mVLDPE and has added thereto a β-crystal nucleating agent (i.e., has β-crystal activity), and this is fed to an extruder and melt at a temperature of from 200 to 320° C. and passed through a filter and then extruded from a slit-shaped die and subsequently cast onto a cooling metal drum to be cooled and solidified in a sheet shape and made to be a non-stretched sheet. At this time, to the above prepared polypropylene may be added as appropriate an other polymer other than the above described polypropylene. However, the resulting microporous film needs to have anuclear pores.

Here, the melt extrusion temperature is preferably rather low in order to form a large amount of β crystal in the non-stretched sheet. However, when the melt extrusion temperature is below the above range, non-melt material is generated in a melt polymer extruded from the die, becoming a cause of the induction of a step failure such as breakage in a subsequent stretching step in some cases. On the other hand, when the temperature exceeds the above range, the thermal decomposition of the polypropylene is increased, so the film properties of the resulting microporous film such as Yong's modulus and breaking strength may be inferior.

Additionally, the temperature of the cooling metal drum (cast drum) is made to be preferably from 60 to 130° C. The temperature is preferably rather high in order to make a microporous film with a high porosity and a high permeability after stretching by crystallizing the film under appropriately gradual cooling conditions and by forming β crystal uniformly and in large quantity. When the temperature of a cooling drum is less than the above range, the β-crystal content of a first run of the resulting non-stretched sheet may be lowered. On the other hand, when the temperature exceeds the above range, solidification of a sheet on the drum is insufficient, so the uniform peeling of the sheet from the drum is difficult in some cases. Moreover, the permeability of the resulting microporous film tends to become high as the temperature approaches the upper limit among the above mentioned temperature range and become low as the temperature approaches the lower limit, being estimated that the permeability each depends on the amount of β crystal in the resulting non-stretched sheets. Here, the amount of β crystal in a non-stretched sheet corresponds to a β-crystal content obtained from the calorie curve of a first run obtained by use of DSC using a non-stretched sheet as a sample. For the purpose of obtainment of high permeability microporous film, the temperature of the cast drum is preferably from 100 to 125° C.

At this time, the time of a non-stretched sheet contacting with a cast drum (hereinafter, may be simply called the contact time with a drum) is preferably from 6 to 60 sec. Here, the contact time with a drum means a time needed for a non-stretched sheet to peel from the drum, in the above casting step, when the time at which a melt polymer first lands on top of a drum is set to be the initial time (=0 sec). Moreover, when a casting step is constituted by a plurality of drums, the sum of times during which a non-stretched sheet contacts those drums is the contact time with the metal drums. When the contact time with a metal drum is below the above range, a non-stretched sheet adheres, although depending on temperature, at the above peeling time point, or the amount of β crystal generated in a non-stretched sheet is small (the β-crystal content of the non-stretched sheet is low), so the porosity of a film after biaxial stretching is sometimes lowered to an insufficient level. When the contact time with the metal drum exceeds the above range, although depending on the size of the metal drum, the rotating speed of the metal drum is lower than required, and thus the productivity is sometimes extremely worsened. In addition, the contact time often cannot substantially get 10 minutes or more. The contact time with a metal drum is more preferably from 7 to 45 seconds, still more preferably from 8 to 40 seconds.

In addition, an adhesion method to a cooling drum may use any technique of an electrostatic (pinning) technique, an adhesion technique of making use of the surface tension of water, an air knife technique, a press roll technique, an underwater casting technique, and the like, and as a technique of obtaining the microporous film of the present invention an air knife technique that is good in thickness control properties and capable of controlling the cooling speed of a non-stretched sheet by means of the temperature of its blasting air, or an electrostatic technique of affixing a non-stretched sheet by electrostatic force is preferably used. Here, in an air knife technique, air is blasted from a non-drum face and its temperature is preferably from 10 to 200° C., and the cooling speed of the surface is controlled to thereby control the surface β crystal amount, so the surface porosity can be controlled, i.e., the permeability of the resulting microporous film can be controlled.

Additionally, when second and third layers are laminated by co-extrusion onto at least one side of the microporous polypropylene film to make a laminate, desired resin other than the above described polypropylenes are each prepared as required, these resins are fed to different extruders and molten at a desired temperature, and then these melts are joined in a polymer tube or in a die after passage of a filter and extruded from a slit-shaped die at respective target lamination thicknesses and subsequently cast onto a cooling drum and cooling solidified in a sheet form to be able to make a non-laminated stretching sheet.

Next, the resulting non-stretched (laminated) sheet is biaxially stretched by means of the longitudinal-transverse sequential biaxial stretching method.

First, a non-stretched film is preheated through a roll kept at a predetermined temperature and its film is continuously kept at a predetermined temperature and passed between rolls having different rotating speeds and then stretched in its longitudinal direction and then immediately cooled.

Here, the stretching ratio in a longitudinal direction is important in order to highly balance the porosity with the strength in the longitudinal direction and further produce a high permeation microporous film. The real stretching ratio in a longitudinal direction when a microporous polypropylene film is produced by means of a usual longitudinal-transverse sequential biaxial stretching method is in the range of from 3 to 4.5 times. When the real stretching ratio exceeds 5 times, stable film production becomes difficult, leading to the breakage of the film by transverse stretching. However, in the present invention, for making a microporous film with a high porosity and a high permeability, the real stretching ratio in the longitudinal direction is preferably made to be from 5 to 10 times. At this time, a microporous polypropylene film of the present invention is preferably made to contain the above described HMS-PP, thereby being capable of stable, high magnification ratio stretching in a longitudinal direction. When the real stretching ratio in a longitudinal direction is below the above range, the porosity of the resulting microporous film is lowered and the permeability may be inferior. Also, due to a low ratio, the film producing speed (=line speed) is decreased even at the same casting speed and productivity is inferior in some cases. When the real stretching ratio in a longitudinal direction exceeds the above range, the film is broken and scattered by longitudinal or transverse stretching, so the film producibility is worsened in some cases. The real stretching ratio in a longitudinal direction is more preferably from 5 to 9 times, still more preferably from 5 to 8 times.

At this time, the longitudinal stretching speed is preferably from 5,000 to 500,000%/min from the viewpoints of productivity and stable film producibility. In addition, the implementation of longitudinal stretching with two or more stages may be preferred in some cases from the viewpoints such as high porosity making, permeability improvement and surface defect suppression. Also, the longitudinal stretching temperature is preferably, for example, from 95 to 120° C. from the viewpoints of stable film producibility, thickness irregularity suppression, improvement of porosity and permeability, and the like. In addition, in a cooling step after longitudinal stretching, provision of relaxation in a longitudinal direction to an extent of not worsening the thickness irregularity and permeability of a film is preferred from the viewpoint of dimension stability in a longitudinal direction. Additionally, a desired resin layer may be placed on a film after longitudinal stretching as appropriate by lamination, coating or the like.

Continuously, this longitudinal stretched film is introduced into a tenter type stretching machine and each is preheated at a predetermined temperature and stretched in a transverse direction.

Here, the real stretching ratio in a transverse direction is preferably 12 times or less. When the real stretching ratio in a transverse direction exceeds 12 times, film producibility may be worsened. The transverse stretching temperature is preferably, for example, from 100 to 150° C., from the viewpoint of stable film producibility, thickness irregularity suppression, improvement of porosity and permeability, and the like. Moreover, the transverse stretching speed is preferably from 100 to 10,000%/min from the viewpoints of productivity and stable film producibility.

After the film is stretched in a transverse direction, the film is thermally fixed at from 100 to 180° C. and cooled while it is further given a relaxation of 1% or more in a transverse direction from the viewpoints of dimension stability of the resulting microporous film and the like. Furthermore, as required, at least one side of the film is subjected to corona discharge treatment in the air, nitrogen, or in a mixture atmosphere of carbon dioxide gas and nitrogen. Next, the film is rolled up to thereby obtain a microporous film of the present invention.

Here, the stretching speed in the present invention is calculated using the equation below when the film is stretched by means of a pair of rolls having different rotating speeds in the stretching step. The stretching method is used for the longitudinal stretching step in the case of longitudinal-transverse sequential biaxial stretching.

$$\text{Longitudinal stretching speed (\%/min)} = \{(\text{longitudinal stretching real ratio}) - 1\} \times 100 / \{(\text{roll interval}) / (\text{rotating speed of high speed roll})\}$$

wherein the roll interval (m) corresponds to a stretching zone in the longitudinal stretching step. The time needed for the film to pass through the stretching zone in the pair of the rolls can be calculated by dividing this roll interval by the rotating speed of the high speed roll (m/min). In addition, the rotating speed of the high speed roll is a rotating speed of a roll located on a rolling-up machine side of the pair of the rolls that implement the stretching. Additionally, when a film is stretched by means of a plurality of pairs of rolls, each time needed for a film to pass through each stretching zone needs to be calculated and may be calculated from the following equation:

$$\text{Longitudinal stretching speed (\%/min)} = \{(\text{longitudinal stretching real ratio}) - 1\} \times 100 / [\Sigma\{(\text{roll interval}) / (\text{rotating speed of high speed roll})\}].$$

Moreover, in the stretching step, when a film is stretched using a tenter, the following equation is used for the calculation. The stretching technique is used in the transverse stretching step in the case of longitudinal-transverse sequential biaxial stretching.

$$\text{Transverse stretching speed (\%/min)} = \{(\text{transverse stretching real ratio}) - 1\} \times 100 / \{(\text{transverse stretching zone length}) / (\text{line speed})\}$$

wherein the transverse stretching zone length (units: m) refers to the length, in the line direction, of a zone in which a film is transversely stretched in the tenter. The time needed for the film to pass through the transverse stretching zone can be calculated by dividing this zone length by the line speed (units: m/min). Furthermore, the line speed refers to a film delivering speed when the film passes through the transverse stretching zone.

In another case, when a film is stretched using a film stretcher, a film can be produced by directly inputting a desired stretching speed.

Here, when the porosity of the resulting microporous film is made high, or the permeability is improved, or in particular the average pore size is enlarged, in its stretching step, the stretching speed in at least one direction is preferably less than 2,000%/min, more preferably less than 1,000%/min. In the present invention, the use of such stretching conditions enables the porosity of the resulting microporous film to be increased, the permeation performance to be improved, and in particular the average pore size to be remarkably improved.

In this manner, extreme lowering of a stretching speed as compared with the case of the existing film producing process is attainable, for example, by decreasing a casting speed in a film producing step (i.e., to decrease film producing speed (a line speed)), or by making long the time needed when a film is passed through the stretching zone such as making the stretching zone long. In the former method, the production area of a film per time may be decreased, so the latter method is preferred. Making the stretching zone long can be attained by, for example, increasing the roll interval in the case of a longitudinal stretching step and by increasing the stretching zone length of a tenter for a transverse stretching step. Of these, making the transverse stretching zone long can be most easily attained and also renders the above advantage to be large. Therefore, when the longitudinal-transverse sequential biaxial stretching technique is used, making the stretching speed in a transverse stretching satisfying the above range is particularly preferred. For the purpose of increasing the porosity, improving permeation performance and also increasing the average pore size, the stretching speed in its stretching step in at least one direction is more preferably 900%/min or less, still more preferably 800%/min or less, most preferably 700%/min or less. In the present invention, the lower the stretching speed in at least one direction, the higher the porosity can be, and consequently the permeability performance can be improved, and the average pore size can be remarkably improved. However, if the stretching speed is too low, the line speed is extremely low or the existing film producing apparatus needs to be modified in order to make the stretching zone long, and therefore its economic efficiency is inferior in some cases. Thus, the stretching speed is, for example, preferably 50%/min or more.

Next, a microporous film of the present invention is used as a separator to fabricate an electric storage device. At this time, a microporous film of the present invention may be directly used as a separator, or the microporous film is subjected to a variety of treatment such as antistatic treatment, hydrophilic treatment and metal vapor deposition treatment, and then can also be used as a separator. The above antistatic treatments or hydrophilic treatments that are preferred include, for example, immersion treatment of immersing a film in a solution in which a variety of antistatics or hydrophilic agents such as a variety of surfactants are dissolved or dispersed, but are not limited thereto, for obtainment of sufficient treatment effects not only on the film surface, but also the inside of the film (the inner wall portion of a pore).

An electric storage device according to the present invention refers to a device that can store electricity inside and/or takes out electricity out of its inside, has a separator placed between its cathode and anode, and is filled with an electrolyte solution. More specifically, the examples include primary cells represented by a manganese dry cell, an alkali manganese dry cell, a nickel dry cell, a silver oxide cell, an air zinc cell, graphite fluoride lithium cell, manganese dioxide lithium cell, a thionyl chloride/lithium cell, a lithium ion cell, and the like, secondary cells represented by a lead battery, a nickel/cadmium cell, a nickel hydrogen cell, a nickel zinc cell, a lithium ion cell and the like, capacitors such as an electric double-layer capacitor and an electrolyte capacitor, and the like, but are not limited thereto.

An electric storage device using a microporous film of the present invention as a separator is preferably a lithium ion cell that has a high energy density and also a high power density, but not limited thereto. A preferred embodiment will be described below when a microporous film of the present invention is used as a separator for a lithium ion cell.

A lithium ion cell generally includes primarily a separator using a microporous film of the present invention, a non-aqueous electrolyte solution, an anode including a lithium compound (an anode during discharging) and a cathode.

The above non-aqueous electrolyte solution is preferably prepared by dissolving a lithium salt in a non-aqueous solvent. In addition, a variety of ionic liquid may be used.

The non-aqueous solvents include at least one or more species selected from non-protonic electrolyte solutions such as propylene carbonate, ethylene carbonate, dimethyl carbonate, diethyl carbonate, dimethoxyethane, tetrahydrofuran, γ-butyl lactone, methyl propionate, butyl propionate, ethyl propionate, dimethyl sulfoxide, and sulfolane, but are not limited thereto.

The lithium salts include at least one or more species selected from $LiBF_4$, $LiClO_4$, $LiPF_6$, $LiAsF_6$, $CF_3SO_3Li$, $(CF_3SO_2)_2NLi$, and the like.

The anode including a lithium compound preferably uses, for example, a lithium composite oxide represented by the general formula $Li_xMO_2$ represented by $LiCoO_2$, $LiNiO_2$, $LiMnO_2$, and the like (wherein, M is one or more transition metals, preferably at least one or more transition metals selected from Mn, Co, Ni, and the like, and X is from 0.05 to 1.10 both inclusive), or a chalcogen compound such as S, Se or Te, or the like. A mixture including a variety of electroconductive agents such as the anode active materials and carbon black and a variety of binding agents such as poly(vinylidene fluoride) and polytetrafluoroethylene is applied onto a collector including an aluminum foil, and dried to thereby preferably fabricate an anode. At this time, the mixture may be as appropriate subjected to rolling treatment.

The cathode preferably uses, in addition to lithium metals and lithium alloys, a variety of carbon materials capable of doping/dedoping a lithium ion, represented by non-crystalline carbon, non-graphitizable carbon, easily-graphitizable carbon, graphite, or the like. The cathode is preferably fabricated by applying a mixture of this cathode material and a binding agent such as an acrylic resin onto a collector including a metal foil such as a nickel foil or a copper foil, and drying the resulting material. At this time, the material may be as appropriate subjected to rolling treatment.

An electric storage device separator directly using a microporous film of the present invention or processed as described above is pinched, wound or laminated between the resulting anode and cathode. At this time, the separator is inserted therebetween in such a way that the innermost face and the outermost face of the resulting wound body or laminate becomes the electric storage device separator of the present invention. Into the resulting wound body or laminate are inserted an anode terminal produced by aluminum, an aluminum alloy, copper, nickel or the like and a cathode produced by nickel, copper, stainless, iron or the like such that they are respectively contacted with the anode and cathode. Thereafter, the resulting material is processed as required in a desired shape such as an angular shape, and then the material is inserted into a cylinder-shaped, angular or coin-shaped electric storage device case or into, for example, a variety of film laminates represented by a laminate including an aluminum foil and a monolayer or multi-layer film. Then, an electrolyte solution is poured thereinto, and the electric storage device case or the laminated is sealed to make a lithium ion cell.

When an electric storage device of the present invention is made to be, for example, a lithium ion cell, the porosity of an electric storage device separator to be used is extremely high, the amount of an electrolyte solution holding can be increased, and a high energy density lithium ion cell can be made. In addition, because the permeability of an electric storage device separator to be used itself is high, the internal resistance of an electric storage device can be lowered, so a high power density lithium ion cell can be made. In other words, a cell can be made that can take out a larger current in a shorter time. Further, since the strength of an electric storage device separator to be used in a longitudinal direction is high, even if a separator itself is made thin, excellent handling properties can be kept, whereby the volume of an electrode active material occupying the electric storage device is increased, so a lithium ion cell with a high electric storage device capacity can be made.

As described above, a microporous film for an electric storage device separator of the present invention has little step contamination due to components making up the film and has an extremely high porosity and a high permeability as compared with conventional microporous films, and thus can improve the energy density and the power density of an electric storage device in which the film is used as a separator. Moreover, although the film has a high porosity, the strength in the longitudinal direction is also high, so in a processing step to an electric storage device in which the film is used as a separator, the film is not stretched, or wrinkled or broken and is excellent in handling properties. In addition, as required, the separator itself can be made thin while maintaining handling properties and this can increase the capacity of an electric storage device. In this manner, a microporous film for an electric storage device separator of the present invention is widely used not as auxiliary material of an electric storage device, but as a high performance separator capable of actively contributing to higher performance of an electric storage device.

[Method of Measuring Characteristic Value]

The terms and the measuring methods commonly used in the present invention will be summarized and described below.

(1) Porosity

A specific gravity was measured for a sample cut to a size of 30×40 mm at 23° C. at 65% RH using a high-accuracy electronic densimeter (SD-120L) available from Mirage Trading Co., Ltd. in accordance with JIS K 7112 (1999) A Method (pycnometer and hydrostatic method). A similar measurement for the same sample was performed 5 times and the average value of the resulting specific gravities was set to be the specific gravity (d1) of the sample.

The sample was sandwiched with aluminum plates having a thickness of 0.5 mm and the resulting material was melt/compressed by heat pressing at 280° C., and then the resulting sheet was immersed in water at 30° C. together with the aluminum plates for rapid cooling. The measurement was carried out on the resulting sheet 5 times by means of the same method as the above and the average value of the resulting specific gravity was set to be the specific gravity (d0) after sample preparation. The porosity of the film from resulting d1 and d0 was calculated using the following equation (units: %):

$$\text{Porosity (\%)} = \{1 - d1/d0\} \times 100$$

Additionally, only when a microporous film absorbed water thereinto, and separately the mass (g) and the thickness of a film having the above size were measured and d1 was calculated from the evaluated volume ($cm^3$).

(2) Strength in Longitudinal Direction

The breaking strength was measured at 23° C. at 65% RH in accordance with JIS K 7127 (1999, test piece type 2) by means of a film strength and elongation measuring apparatus (AMF/ATA-100) available from Orientec Co. Specifically, a sample was cut to a size of 15 cm in the longitudinal direction and 1 cm in the transverse direction, and was elongated with an original length of 50 mm at a tensile speed of 300 mm/min to measure the breaking strength (units: MPa). A similar measurement was repeated 5 times for the same sample and the average value of the resulting breaking strength was set to be the strength of the sample in the longitudinal direction.

(3) Average Pore Size

The bubble point was measured in accordance with a bubble point method (half dry method) of JIS K 3832 (1990) by means of an automatic size distribution porometer "PERM-POROMETER" available from POROUS MATERIALS, Inc. In addition, the measuring conditions are as follows:

Test solution: "Florinate" FC-40 available from 3M
Test temperature: 25° C.
Test gas: Air
Analysis software: Capwin
Measuring conditions: Automatic measurement by the default conditions of Capillary Flow Porometry-Wet up, Dry down Moreover, in a bubble point method, the following relationship holds between the pore size (pore diameter) and the test pressure:

$$d = C\gamma/P \times 10^3$$

wherein d is a pore diameter (nm), C is a constant, $\gamma$ is the surface tension of Florinate (16 mN/m), and P is a pressure (Pa).

Here, on the basis of the above, the average pore size was calculated from a ½ half leakage curve using data analysis software attached to the apparatus. In addition, this measurement is described in detail also in a manual attached to the apparatus. A similar measurement was repeated 5 times for the same sample and the average value of the resulting average pore sizes was set to be the average pore size of the sample (units: nm).

(4) Affirmation of Having Anuclear Pores

An ultrathin section having a cross section in the transverse direction-thickness direction of a microporous film was sampled by means of a resin embedding method using an epoxy resin using an ultramicrotome. The sampled slice was colored with $RuO_4$ and its cross section was observed under the conditions below under a transmission electron microscope. Additionally, the sample preparation and the cross section observation were carried out in Toray Research Center, Inc.

Apparatus: Transmission electron microscope (TEM) H-7100FA available from Hitachi, Ltd.
Acceleration voltage: 100 kV
Observation magnification: 40,000 times An image was sampled such that one side of an image was parallel to the transverse direction, and continuously observed in parallel to its thickness direction, from one surface to the other surface of a film. At this time, the size of each image is adjusted such that the one side parallel to the transverse direction became 5 µm relative to the real size of the film. On a plurality of the resulting images were placed OHP sheets (EPSON exclusive OHP sheets available from Seiko-Epson Corp.). Next, among the observed pores, if there was an observed nucleus inside the pore, the site of the nucleus on the OHP sheet was black-painted with a magic pen. The resulting images of the OHP sheets were red under the following conditions.

Scanner: GT-7600U available from Seiko-Epson Corp.
Software: Epson TWAIN ver. 4.20J
Image type: Line drawing
Resolution: 600 dpi$_0$ The resulting image was image-analyzed by means of Image-Pro Plus, Ver. 4.0 for Windows available fro Planetron Corp. At this time, space calibration was carried out using the scale of the scanned cross section image. Additionally, the measurement conditions were in the following:

The format of the outline is painted by display option setting within the count/size option.
The exclusion on the borderline was made None by object extraction option setting.
A dark-colored object is automatically extracted by luminance range selection setting during measurement.

Under the above conditions, the proportion of the area of the nucleus (black-painted portion) to the total area of the film and thus the measurement targeted transverse direction× thickness direction=5 µm×film thickness (measured in (16) below) was calculated in the percentage to be set to be the area ratio (R) of the nucleus (units: %). From the above, when the proportion of the nucleus to the total area of a film is 3% or less, the film is defined as having anuclear pores and being set to be Yes. In addition, a film in which the ratio R exceeds 3% does not have anuclear pores, and thus is set to be No.

(5) Judgment of Biaxial Orientation

The orientation state of a film is judged from an X-ray diffraction photography obtained when an X-ray is radiated from the three directions indicated below relative to the film.

Through incidence: Incidence perpendicular to a face formed in the longitudinal direction (MD)/transverse direction (TD) of a film.
End incidence: Incidence perpendicular to a face formed in the transverse/thickness directions of a film.
Edge incidence: Incidence perpendicular to a face formed in the longitudinal/thickness directions of a film.

In addition, samples are laminated such that films are placed neatly side by side in their direction and the thickness is about 1 mm, and cut out and then measured.

An X-ray diffraction photograph was measured by an imaging plate method under the following conditions.

X-ray generator: 4036A2 Model available from Rigaku Corporation
X-ray source: CuKα ray (using Ni filter)
Power: 40 Kv, 20 mA
Slit system: 1 mm φ pinhole collimator
Imaging plate: FUJIFILM BAS-SR
Photographing conditions: Camera radius (distance between a sample and the imaging plate) 40 mm and exposure time of 5 minutes.

Here, the differences of no orientation, uniaxial orientation, biaxial orientation of films, as described, for example, in Kiyoichi-Matsumoto et al., "Sen-i Gakkaishi" Vol. 26, No. 12, 1970, pp. 537-549; "Film wo Tsukuru," written by Kiyoichi Matsumoto, KYORITSU SHUPPAN CO., LTD (1993), pp. 67-86; "Kobunshi Kagaku Joron (2nd edition)," written by Seizou Okamura et al., Kagaku-Dojin Publishing Company, Inc. (1981), pp. 92-93; etc., can be determined by the following criteria:

No orientation: Even in X-ray diffraction photographs in any directions, a Debye-Scherrer ring having substantially roughly uniform intensities can be obtained.
Longitudinal uniaxial orientation: In an X-ray diffraction photograph of End incidence, a Debye-Scherrer ring having roughly uniform intensities can be obtained.
Biaxial orientation: Even in X-ray diffraction photographs in any directions, a diffraction image, reflecting its orientation, with no uniform diffraction intensities, can be obtained.

(6) Evaluation of I(MD)/I(TD) and Affirmation of β Crystal Activity by Means of Wide Angle X-Ray Diffraction Method

[Evaluation of I(MD)/I(TD)]

An intensity distribution in a peripheral direction (azimuthal angle (β) direction) about diffraction peaks of the face (−113) near 2θ=43° was measured under the measuring conditions below by means of a wide angle X-ray diffraction method (diffractometer method).

Sample: Films are laminated such that films are placed side by side in their direction and the thickness is about 1 mm, and cut out and then measured.
X-Ray generator: 4036A2 (tube type) available from Rigaku Corporation
X-Ray source: CuKα ray (using a Ni filter)
Power: 40 kV, 20 mA
Optical system: Pinhole optical system (2 mm φ) available from Rigaku Corporation
Goniometer: available from Rigaku Corporation Slit system: 2 mm φ (above) −1°–1°
Detector: Scintillation counter
Counter recorder: RAD-C Model available from Rigaku Corporation
Measuring method: Transmission method
2θ/θ scan: Step scan, 2θ range of 10 to 55°, 0.05° step, accumulation time 2 sec
Azimuthal angle (β) scan: 2θ≈43° (fixed), step scan, β measurement range of 0 to 360°, 0.5° step, accumulation time 2 sec Simple depictions about a device of 2θ/θ scan and azimuthal (β) scan and a geometrical configuration of a sample are respectively shown in FIGS. 3 and 4.

Figure 3:
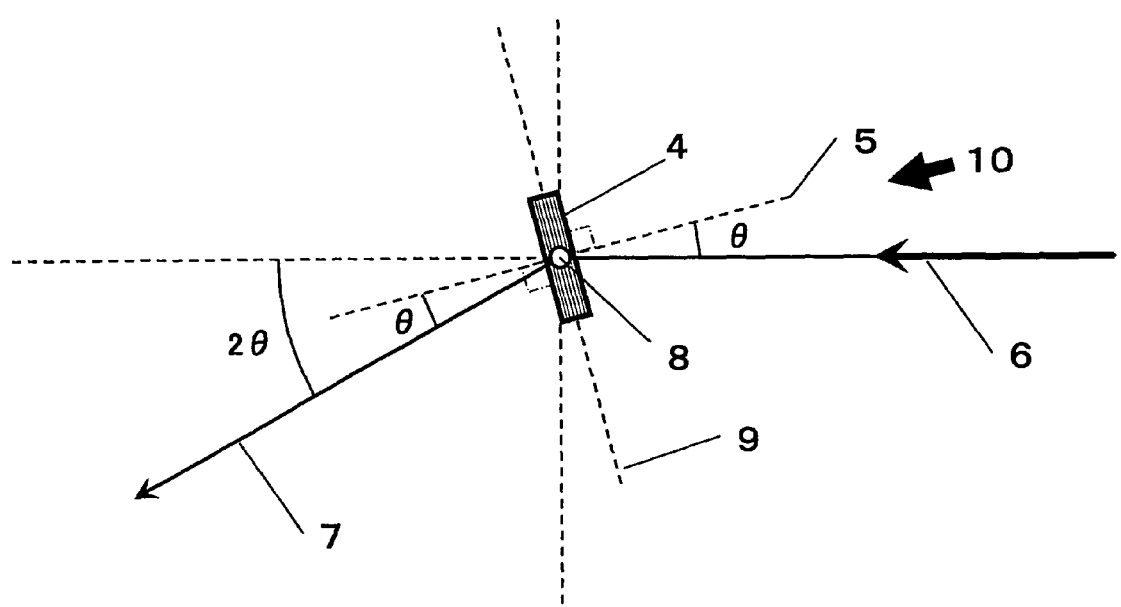
FIG. 3 is a diagram schematically indicating a configuration of a sample and a device when a 2θ/θ scan X-ray diffraction profile described in the above measuring method (6) is sampled by means of a wide angle X-ray diffraction method.

FIG. 3 is a diagram schematically indicating the configurations of a sample and a device when a 2θ/θ scan X-ray diffraction profile is sampled. A normal line 5 relative to the film surface of a sample 4 is inclined with θ(°) relative to an incidence X-ray 6, a slit (not shown) is placed ahead of a diffraction X-ray 7, further a scintillation counter (not shown) for X-ray measurement is present, and the scintillation counter is configured to be inclined with 2θ (°). Although not shown, the incidence X-ray 6 is obtained from an X-ray source, passing through a Ni filter, a pinhole collimator and a slit. There is a goniometer axis 8 as a rotatable axis to adjust the angle between the scintillation counter and the sample. In a β direction scan, the sample is parallel to its film surface and thus rotates under the above conditions along a rotation flat face 9 orthogonal to the normal line 5.

Figure 4:
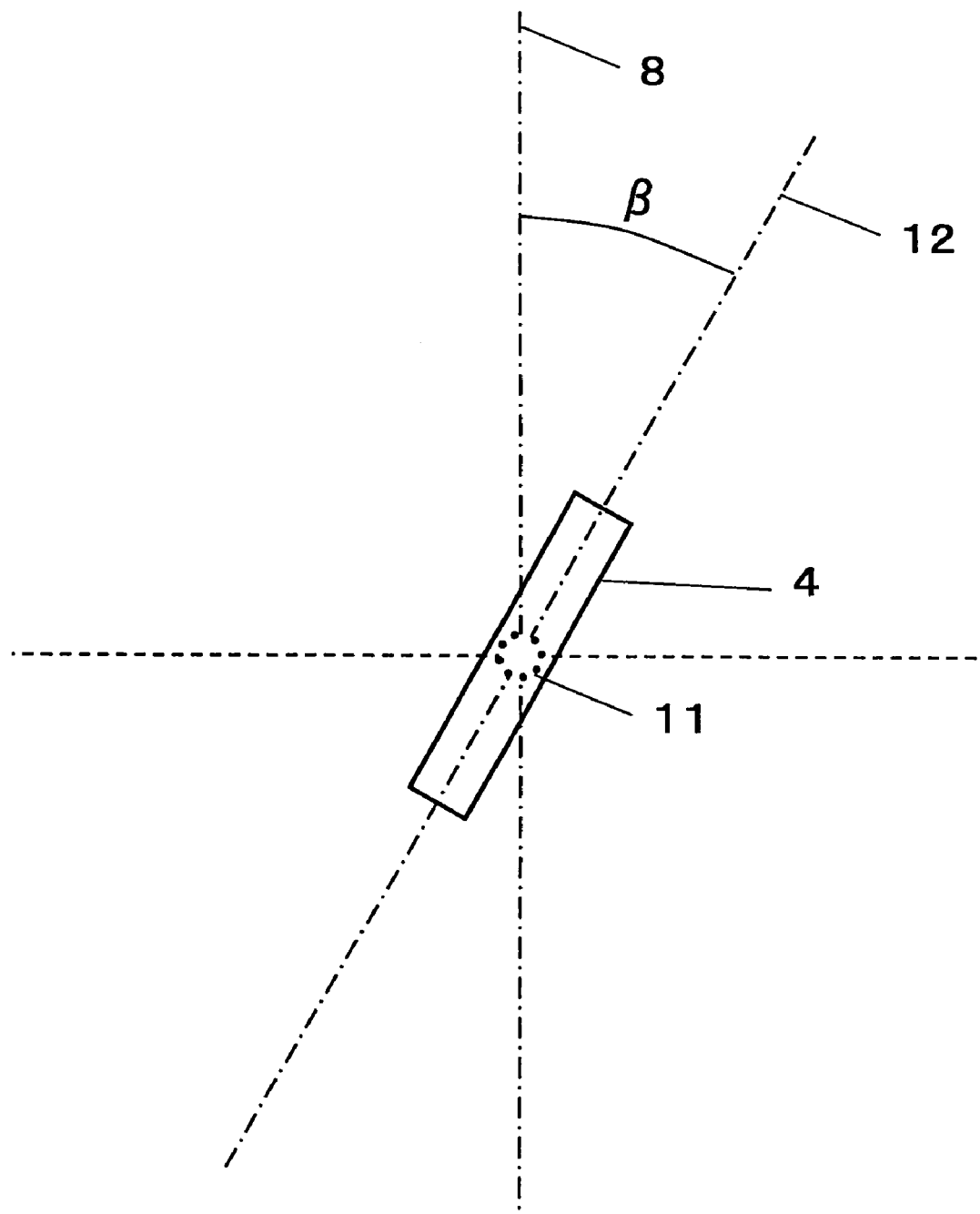
FIG. 4 is a diagram schematically indicating a configuration of a sample when an intensity distribution profile in an azimuthal (β) direction described in the above measuring method (6) is sampled by means of a wide angle X-ray diffraction method.

FIG. 4 schematically indicates a geometric configuration of the sample when the sample of FIG. 3 is observed from an observation point (reference numeral 10 of FIG. 3) in the normal direction of the film face (reference numeral 5 of FIG. 3). β is the angle which the goniometer axis 8 makes with a longitudinal direction 12 of the sample. Additionally, in these drawings, although the sample is drawn long in the longitudinal direction for the sake of convenience, if the direction to be a standard is clear and a radiation portion 11 of the X-ray during measurement as shown below is constant, the size of the sample in the longitudinal and transverse directions is not important. Moreover, a sample is set, for its evaluation of the orientation distribution of the crystal chains in the film face, such that the film surface is parallel to the rotation flat face 9 in the β direction and the goniometer axis 8.

Here, diffraction peaks of the face (−113) near 2θ=43° include components in the molecular chain axis direction. Thus, the X-ray intensity peaks of β=0 and 180° correspond to components oriented to the transverse direction among the crystal chains within the film face; the X-ray intensity peaks of β=90 and 270° correspond to crystal chain components oriented to the longitudinal direction. In other words, when the integration intensities of the peaks of β=0 and 180° are sufficiently large as compared with the integration intensities of the peaks of β=90 and 270°, the crystal chains correspond to be primarily transversely oriented.

First, β is fixed to 0° or 90°, 2θ/θ scan is performed under the above conditions. Next, to θ and 2θ to be the tops of the peaks near 2θ=43° are fixed the positions of a sample and a counter. Subsequently, the sample is scanned under the above conditions in the β direction to thereby obtain a target X-ray intensity distribution. At this time, a radiation portion of the X-ray is necessarily constant even in any β's in such a manner that an X-ray does not deviate from the sample due to β and thus the apparent intensity does not alter.

The integration intensity (I(MD)) in the longitudinal direction and the integration intensity (I(TD)) in the transverse direction are evaluated by means of the technique below using the resultant profile in the β direction.

i. In the range of β of from 0 to 360°, a baseline is drawn passing through the lowest intensity.

ii. In the ranges of β's below, respectively, the integration intensities I(MD) and I(TD) are calculated as areas of portions surrounded by the baseline and an X-ray intensity curve.

I(MD): $45 \leq \beta \leq 135°$, I(TD): $135 \leq \beta \leq 225°$

From these, I(MD)/I(TD) was calculated and the resulting value was made to be a measure of the orientation balance of crystal chains within the film face.

[Affirmation of β Crystal Activity]

In (7) or (13) below, there is a melt peak having a top of from 140 to 160° C., but if it is not sure to be attributable to the melt of the β crystal, it is decided that the sample has β crystal activity on the basis of the fact that the top of a melt peak is present between 140 to 160° C. and that, in a sample prepared under the conditions below, the K value calculated from each diffraction peak intensity of the diffraction profiles obtained by the above 2θ/θ scan is 0.3 or more.

The sample preparation conditions and the measurement conditions of the wide angle X-ray diffraction method are indicated below.

Sample: The directions of samples are made to be placed neatly side by side and laminated in such a manner that the sample thickness after heat press preparation becomes about 1 mm. This sample was sandwiched between two aluminum plates having a thickness of 0.5 mm and heat pressed at 280° C. for 8 minutes to thereby be molten and compressed and to substantially non-orient the polymer chains. The resulting sheet, immediately after taken out along with the aluminum plates, is immersed in boiling water at 100° C. for 5 minutes to thereby crystallize it. Thereafter, the sample cut out from the sheet obtained by cooling at 25° C. in the atmosphere is subjected to measurement.

Wide angle X-ray diffraction method measurement conditions: An X-ray diffraction profile is obtained by 2θ/θ scan in accordance with the above conditions.

Here, the K value can be calculated by the equation below from the diffraction peak intensity of the face (300) attributable to a β crystal (set to be $H\beta_1$), observed near 2θ=16°, and the diffraction peak intensities of the faces (110), (040) and (130) attributable to the α crystal (respectively, set to be $H\alpha_1$, $H\alpha_2$ and $H\alpha_3$), observed near 2θ=14, 17, and 19°, respectively. The K value is an empirical value indicating the ratio of a β crystal, and details of the K values such as a method of calculating each diffraction peak intensity may be given by A. Turner Jones, et al., "Makromolekulare Chemie, 75, pp. 134-158 (1964).

$$K = H\beta_1 / \{H\beta_1 + (H\alpha_1 + H\alpha_2 + H\alpha_3)\}$$

In addition, the structures of crystal types of polypropylene (α crystal, β crystal) the resulting wide angle X-ray diffraction profile, and the like are given by many reports including, for example, "Polypropylene Handbook," written by Edward P. Moore, Jr., Kogyo Chosakai Publishing Co., Ltd. (1998), pp. 135-163; "Kobunshi no Kozoh (Structures of Polymers)," written by Hiroyuki Tadokoro, Kagaku-Dojin Publishing Company, Inc (1976), p. 393; A. Turner Jones, et al., "Makromolekulare Chemie," 75, pp. 134-158 (1964), etc. and including references mentioned therein, and you may refer to them.

(7) Affirmation of β Crystal Activity

Figure 2:
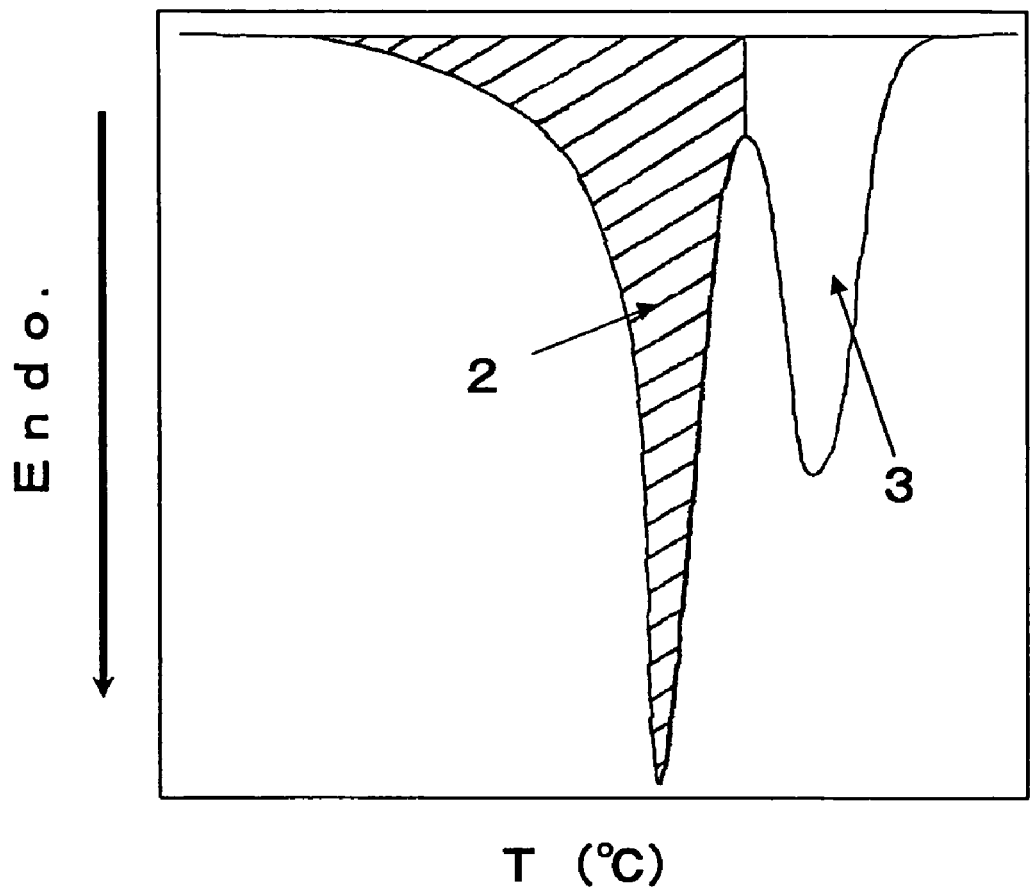
FIG. 2 is a diagram schematically indicating a heat of fusion (ΔHβ) calculated from the peak area of an endothermic peak with melting of a β crystal in which a top is observed from 140 to 160° C.

Measurement was carried out in accordance with JIS K 7122 (1987) using the thermal analyzer RDC220 Model available from Seiko Instruments. From 4.5 to 5.5 mg of a film was placed and loaded in an aluminum pan. This was set to the above apparatus, which was temperature-increased from 30° C. to 280° C. at a speed of 10° C./min in a nitrogen atmosphere. After the completion of the temperature increase, the film was kept left for 5 minutes at 280° C. and subsequently cooled to 30° C. at a speed of 10° C./min. After the completion of the cooling, it was kept left for 5 minutes at 30° C. and then, in a calorie curve (reference numeral 1 of FIG. 1) obtained when it was temperature-increased again to 280° C. at a speed of 10° C./min, when an endothermic peak (reference numeral 2 of FIG. 2), with the melt of a β crystal, having a top from 140° C. inclusive to 160° C. exclusive is observed, it was decided that the film has β crystal activity. In addition, herein, an endothermic peak refers to a peak in which the heat of fusion is 10 ml/mg or more. A calorie curve obtained by the first temperature increase may be called a calorie curve of the first run; a calorie curve obtained by the second temperature increase may be called a calorie curve of the second run. Additionally, a heat of fusion is represented by an area surrounded by a baseline, in which a calorie curve deviates from the baseline to an endothermic side with temperature increase and then returns to the position of the baseline, and a calorie curve. This area was calculated by computer processing by drawing a linear line from the melt initiation temperature position on the baseline until the intersection of a calorie curve toward the high temperature area. FIG. 2 shows that reference numeral 2 is the heat of fusion of an endothermic peak with the melt of a β crystal and that reference numeral 3 is the heat of fusion of an endothermic peak with crystals other than the β crystal. The similar way as described above may be performed also in the case where the β crystal activity of polypropylene of a starting material is ascertained. In the table, a film having β crystal activity is indicated as Yes, a film not having β crystal activity is indicated as No.

(8) Gurley Permeability

A sample was measured at 23° C. at 65% RH in accordance with JIS P 8117 (1998) (units: sec/100 ml). A similar measurement was repeated 5 times for the same sample and the average value of the resulting Gurley permeabilities was set to be the Gurley permeability of the sample. At this time, when the average value of Gurley permeabilities exceeds 1,000 sec/100 ml, the sample is regarded as not substantially having permeability and set to be infinity ($\infty$) sec/100 ml.

(9) Melt Flow Rate (MFR)

A sample was measured in the conditions M (230° C., 2.16 kgf (21.18 N) in accordance with JIS P 7210 (1999) (units: g/10 min). A similar measurement was repeated 5 times for the same sample and the average value of the resulting MFRs was set to be the MFR of the sample.

(10) Isotactic Pentad Fraction (mmmm)

Polypropylene of a film is extracted with n-heptane at 60° C. for two hours and impurities/additives in the polypropylene are removed and then vacuum-dried at 130° C. for two hours or more to make a sample. The sample is dissolved in a solvent and an isotactic pentad fraction (mmmm) is evaluated under the following conditions by means of $^{13}$C-NMR (units: %).

Measurement Conditions
Apparatus: DRX-500 available from Bruker
Measurement nucleus: $^{13}$C nucleus (resonance frequency: 125.8 MHz)
Measurement concentration: 10 weight %
Solvent: benzene: Heavy orthodichlorobenzene=1:3 mixture solution (volume ratio)
Measurement temperature: 130° C.
Number of spin rotations: 12 Hz
NMR sample tube: 5 mm tube
Pulse width: 45° (4.5 μs)
Pulse repeating time: 10 seconds
Data point: 64 K
Number of accumulations: 10,000 times
Measurement mode: complete decoupling Analysis Conditions Fourier transformation is carried out by setting LB (line broadening factor) as 1 and the mmmm peak is set to be 21.86 ppm. Peak dividing is performed using WINFIT software (available Bruker). At this time, peak dividing is conducted as below from peaks in the high magnetic field, further automatic fitting of software is carried out, and after the optimization of peak dividing is performed, the total of peak fractions of mmmm and ss (spinning side band peaks of mmmm) is set to be an isotactic pentad fraction (mmmm).

(1) mrrm
(2) (3) rrrm (divided as two peaks)
(4) rrrr
(5) mrmm+rmrr
(6) mmrr
(7) mmmr
(8) ss (a spinning side band peak of mmmm)
(9) mmmm
(10) rmmr A similar measurement for the same sample was performed 5 times and the average value of the resulting isotactic pentad fractions was set to be the isotactic pentad fraction of the sample.

(11) Isotactic index (II)

Polypropylene of a film is extracted with n-heptane at a temperature of 60° C. for two hours to thereby remove impurities/additives in the polypropylene. Thereafter, it is vacuum-dried at 130° C. for two hours. Then the weight W (mg) of the sample is taken out and placed in a Soxhlet extractor and extracted with boiling n-heptane for 12 hours. Next, this sample is taken out and washed sufficiently with acetone and then vacuum-dried at 130° C. for 6 hours, and subsequently cooled to room temperature and the weight W' (mg) is measured and II is calculated by the following equation:

$$\text{II}(\%)=(W'/W)\times 100(\%) \qquad \text{II}$$

A similar measurement for the same sample was performed 5 times and the average value of the resulting II's was set to be the II of the sample.

(12) Judgment of being Non-Miscible with Polypropylene

First, the directions of films were neatly side by side and the films were laminated such that the sample thickness after heat press preparation becomes about 1 mm. This sample was sandwiched with two aluminum plates of a thickness of 0.5 mm and pressed at 280° C. and molten and compressed to thereby substantially non-orient the polymer chains. The resulting sheet, immediately after taken out together with the aluminum plates, was immersed in boiling water at 100° C. for 5 minutes to crystallize. Thereafter, it was cooled under 25° C. atmosphere and a sample was cut out of the resulting sheet to be subjected to measurement. The dispersion diameter of a non-miscible resin in the resultant sample was calculated by the following manner.

An ultrathin section having a cross section in the longitudinal direction-thickness direction of a non-stretched sheet was sampled using a microtome method. The sampled slice was colored with $RuO_4$ and its cross section was observed under a transmission electron microscope (TEM) in the conditions below. In addition, the sample preparation and observation were carried out in Toray Research Center, Inc. Additionally, for example, a polyethylene resin (including mVLDPE) is colored more darkly than polypropylene.

Apparatus: Transmission electron microscope (TEM) H-7100FA available from Hitachi Co., Ltd.
Acceleration voltage: 100 kV
Observation magnification: 40,000 times An image continuously observed in the thickness direction was sampled from one surface of a sheet to the other surface, and the dispersion diameters of all the different components were measured (units; mm). At this time, a sample in which a different component phase at an image end is cut off does not need to be measured. Additionally, the dispersion diameter of each different component phase is a maximum value, when the size of the different component phase is measured along a linear line parallel to the thickness direction. The dispersion diameters measured are averaged, and the resulting average dispersion diameter was set to be the dispersion diameter of the sample.

From the above, when the dispersion diameter of the resin is 10 mm or more, the resin is regarded to be non-miscible with polypropylene, i.e., indicated as Yes, and the other cases are indicated as No.

(13) β Crystal Content

In a calorie curve of a second run obtained as in (7) above (as an example, reference numeral 1 of FIG. 1), from a heat of fusion (ΔHβ: as an example, reference numeral 2 of FIG. 2) calculated from one or more endothermic peaks with the melt of β crystal in which a top is observed from 140° C. inclusive to 160° C. exclusive and a heat of fusion (ΔHα: as an example, reference numeral 3 of FIG. 2) calculated from an endothermic peak with the melt of α crystal derived from polypropylene other than a β crystal in which a top is observed at 160° C. or more, the β crystal content was evaluated using the equation below. At this time, although a small exothermal or endothermic peak is sometimes observed between the melt peaks of ΔHβ and ΔHα, this peak was excluded.

$$\beta \text{ crystal content} = \{\Delta H\beta/(\Delta H\beta+\Delta H\alpha)\} \times 100$$

A similar measurement for the same sample was performed 5 times and the average value of the β crystal contents was set to be the β crystal content of the sample (units: %). In addition, in the case where the differences of β crystal contents are evaluated according to the process condition such as in the case where non-stretched sheets produced by a variety of cast conditions are measured, measurement may be carried out under the above like conditions except that a calorie curve of a first run is used.

(14) Affirmation of Dispersion state of β Crystal Nucleating Agent

A sample (a chip-shaped material is directly used, and a film sheet-shaped material is cut to a 10 mm square for use purposes) is mounted on cover glass sheet (18×18 mm, No. 1) available from Matsunami Glass Ind., Ltd. and heated at 200° C. and molten by means of an optical microscope equipped with a heating device. After fusion, another sheet of cover glass is made to directly cover it and the resultant material was compressed to thereby make a molten body of a thickness of 0.03 mm. The dispersion states of all the nucleating agents in the thickness direction are observed for arbitrary 5 sites of a sample at an magnification of 400 times at various focus depths, the length and breadth of all the observed nucleating agents are measured and the average of the ratios (=length/breadth) is calculated. A similar measurement for the same sample was performed 5 times and the average value of the ratios of breadths to lengths is set to be the ratio of breadth to length of the sample. In the present invention, it is decided that a sample having a ratio of the length to the breadth of 10 or more is regarded as nucleating agents being dispersed in a needle shape.

(15) Average Particle Diameter of Particles

The volume average diameter measured by means of a centrifugal sedimentation method (using CAPA500 available from HORIBA, Ltd.) is set to be the average particle diameter (μm)

(16) Thickness of Film

Ten points were measured at intervals of 10 cm in the longitudinal and transverse directions of a film by means of a dial gauge thickness meter (JIS B 7503 (1997), UPRIGHT DIAL GAUGE (0.001×2 mm), No. 25, gauge head 5 mm φ flat type, 125 gf load available form PEACOCK), and their average value was set to be the film thickness of the sample (units: μm).

(17) Real Stretching Ratio

In a non-stretched film extruded from a slit-shaped die and cast on a metal drum and cooled and solidified on a sheet were marked one cm squares such that each side was parallel to the longitudinal direction and to the transverse direction, and then stretching and rolling-up were performed and the lengths (cm) of the squares of a film obtained were measured in the longitudinal direction by 10 squares and in the transverse direction by 10 squares and these average values were respectively set to be the real stretching ratios in the longitudinal direction and the transverse direction.

(18) Film Producibility

When a film was produced at a cast speed of 2 m/min for 5 hours, the film producibility was judged based on the following criteria.

A: Breakage is not caused.
B: Breakage is not caused once.
C: Breakage is not caused twice.
D: Breakage is not caused three or more times.

In addition, the number of breakages was counted based on the following criteria. In other words, if the breakage was caused in the longitudinal stretching step or the transverse stretching step, at the time, one breakage was counted, immediately before the relevant step a film was cut and left to stand while rolling-up (when it was difficult to leave to stand in the step prior to the occurrence of breakage due to some reason, left to stand in the step before the relevant step) and the film was introduced again to the step in which the breakage was caused as soon as machines are ready for processing. For example, when film breakage was generated in the transverse stretching step, the film was once cut between the longitudinal stretching machine and transverse stretching machine (tenter) and the longitudinal stretched film was left to stand while continuously rolling-up and immediately after the completion of the removal of the broken film in the tenter and the adjustment of film passage conditions (temperature, tenter clip running speed, etc.), the film is introduced again into the tenter and transversely stretched and then the film producibility was evaluated. Additionally, the film production time of the above 5 hours is defined as a time including the leaving-to-stand state. A like film production experiment in the same level was performed 5 times and the average value of the resulting breakage numbers is set to be the number of breakages and the film producibility was decided on the basis of the above criteria.

(19) Handling Properties

Slip Step

In (18) above, a film of the present invention was rolled upon itself, with its width being 1 m and its length being 500 m, the resulting film roll was slit at 50 cm intervals by means of a slitter available from Toray Engineering Co., Ltd to make a product.

Cell Processing Step

A microporous film of the present invention, an aluminum foil of a thickness of 100 μm and a copper foil of a thickness of 100 μm were laminated so as to be film/copper foil/film/aluminum foil to be wound up in 100 m, using a lithium ion cell automatic winding device available from Minafuji Seisakusho Co., Ltd.

In any case of the above, it is evaluated that a film which was capable of being rolled up without being stretched, wrinkled and cutting was set to be Yes, and a film of a wound body of a bad shape which was stretched, wrinkled or cut, due to low rigidity was set to be No.

(20) Evaluation of Electric Storage Device Properties

A lithium ion cell using a microporous film of the present invention as a separator was fabricated in the following.

[Fabrication of Lithium Ion Cell]

Material for Anode

| | |
|---|---|
| $LiCoO_2$ (C-012 available from Ceimichemical Co., Ltd.) | 89.5 weight parts |
| Acetylene black (AB: 75% pressed product available from Denki Kagaku Kogyo K.K.) | 4.5 weight parts |
| Poly(vinylidene fluoride) (PVDF: available from Kureha Corp.) | 6 weight parts |
| N-methyl-2-pyrrolidone | 40 weight parts |

The above materials were mixed to produce slurry. The resulting slurry was applied onto an aluminum foil as a collector and dried and punch-processed.

Cathode Material

| | |
|---|---|
| Mesocarbon microbeads (MCMB: 25-28 available from Osaka Gas Chemicals Co., Ltd.) | 93 weight parts |
| The above AB | 2 weight parts |
| The above PVDF | 5 weight parts |
| N-methyl-2-pyrrolidone | 50 weight parts |

The above composition was mixed to produce slurry. The resulting slurry was applied onto an aluminum foil as a collector and dried and punch-processed.

LiPF was dissolved in a solvent in which propylene carbonate and methylethyl carbonate were mixed in a ratio of 3:7 such that the concentration of the LIPF was 1 mol/l, and the resulting material was used as an electrolyte solution. A microporous film was directly sandwiched as a separator between the anode and cathode fabricated above and punch-processed and then each of the anode and cathode terminals was taken out and inserted into a packaging body of a laminate type. Three faces of the packaging body were sealed and then the above electrolyte solution was poured thereinto and subsequently the four faces were sealed under reduced pressure to make an electric storage device.

[Internal Resistance]

The internal resistance of a cell was measured by means of an electric ohm meter (units: mΩ).

[Cycle Properties]

Charging and discharging were repeated at 0.2 C. The discharge capacity of the cell at a third cycle was set at an initial capacity, and the ratio (C) of the discharge capacity at a 300th cycle to that at the initial capacity was evaluated. The higher C is, the more excellent the cell in cycle properties.

[Rate Properties]

The discharge capacity of a cell at 0.2 C and a third cycle was set at the initial capacity and the ratio (P) of the discharge capacity at 10 C thereto was evaluated. The higher P is, the more excellent the cell in rate properties.

EXAMPLE

The present invention will be described by way of example. In addition, for the obtainment of a desired thickness film, unless otherwise mentioned, the amount of extrusion of a polymer was adjusted to a predetermined value. The judgment of the β crystal activity, the β crystal content, and the porosity, of a film, are values obtained from measurements for all the films obtained. Additionally, unless otherwise indicated, films capable of being sampled of the examples and comparative examples were ascertained for biaxial orientation on the basis of the above described measuring method (5). Moreover, in all the examples, R measured on the basis of the above described measuring method (4) was 0%, so all the samples were able to be said to substantially have films with anuclear pores.

Example 1

Polypropylene resin A having the composition below was prepared.

<Polypropylene Resin A>

Polypropylene: Polypropylene WF836DG3 (melt flow rate (MFR): 7 g/10 min) available from Sumitomo Chemical Co., Ltd.

96.8 weight %

High melt strength polypropylene having a long branched chain in a main chain: Polypropylene PF-814 (MFR: 3 g/10 min) available from Basell 3 weight %

β-crystal nucleating agent: N,N'-dicyclohexyl-2,6-naphthalene dicarboxamide (NU-100 available from New Japan Chemicals Co., Ltd. 0.2 weight %

To 100 weight parts of this resin composition were added 0.15 weight part of IRGANOX1010 as an antioxidant available from Ciba-Geigy Ltd. and 0.1 weight part of IRGAFOS168 as a thermal stabilizer available from Ciba-Geigy Ltd. This was fed to a biaxial extruder and molten and kneaded at 300° C., and then extruded in a gat shape, cooled through a water bath at 20° C. and cut to a length of 3 mm with a chip cutter and subsequently dried 100° C. for two hours.

The chip of the resulting polypropylene resin A was fed to a uniaxial extruder and molten and kneaded at 220° C., passed through a single plate filter of 400 mesh and then extruded from a slit-shaped die heated to 200° C. and cast to a drum (=casting drum, cast drum: CD) the surface temperature of which was heated to 120° C., and formed in a sheet shape while the resin was affixed by blowing heat air heated to 120° C. from the non-drum face side of a film using an air knife to obtain a non-stretched sheet. In addition, the contact time with the metal drum was 40 sec at this time.

The resulting non-stretched sheet was preheated by passing through a group of rolls kept at 105° C. and then kept at 105° C. and passed through between rolls having different rotating speeds and subsequently stretched 4 times at 105° C. in the longitudinal direction and cooled to 95° C. Subsequently, this longitudinal stretched film was introduced into a tenter while both the ends of it was pinched with a clip, and preheated at 140° C. and then stretched 8 times at 140° C. in the transverse direction. Next, the film was heat fixed at 155° C. while being given 5% of relaxation in the transverse direction in the tenter and uniformly gradually cooled and then cooled to room temperature and rolled up to obtain a microporous polypropylene film of a thickness of 20 μm. Additionally, the longitudinal stretching speed at this time was 18,000%/min, and the transverse stretching speed was 1,400%/min.

The starting material composition and the film property evaluation results of the resulting microporous film are respectively listed in Tables 1 and 2. The resulting microporous film was excellent in film producibility as well as high in porosity and excellent in permeability. In addition, the film also had a high strength in the longitudinal direction and was excellent in handling properties.

Example 2

A microporous polypropylene film of a thickness of 20 μm fabricated in the same conditions as in Example 1 with the exception that the stretching ratio in the longitudinal direction was increased to 5 times was set to be the case of Example 2. In addition, the longitudinal stretching speed at this time was 30,000%/min and the transverse stretching speed was 1,750%/min.

The results are shown in Tables 1 and 2. The resulting microporous film was excellent in film producibility as well as high in porosity and excellent in permeability. Additionally, the film also had a high strength in the longitudinal direction and was excellent in handling properties.

Example 3

A microporous polypropylene film of a thickness of 20 μm fabricated in the same conditions as in Example 2 with the exception that the stretching ratio in the longitudinal direction was increased to 6 times was set to be the case of Example 3.

In addition, the longitudinal stretching speed at this time was 45,000%/min and the transverse stretching speed was 2,100%/min.

The results are shown in Tables 1 and 2. The resulting microporous film was excellent in film producibility as well as high in porosity and excellent in permeability. Additionally, the film also had a high strength in the longitudinal direction and was excellent in handling properties.

Example 4

A microporous polypropylene film of a thickness of 20 μm fabricated in the same conditions as in Example 2 with the exception that, in place of polypropylene resin A, a resin composition produced by adding and mixing in the ratio of 90 weight % of polypropylene resin A and 10 weight % of polypropylene-based resin B prepared by the composition below was fed to a uniaxial extruder and stretched at 100° C. in the longitudinal direction and stretched at 135° C. in the transverse direction was set to be the case of Example 4. In addition, the longitudinal stretching speed at this time was 30,000%/min and the transverse stretching speed was 1,750%/min.

<Polypropylene-Based Resin B>
Polypropylene: Polypropylene WF836DG3 (melt flow rate (MFR): 7 g/10 min) available from Sumitomo Chemical Co., Ltd.
70 weight %
Polyolefin-based resin: "ENGAGE" 8411 available from "DuPont Dow Elastomers Japan" (mVLDPE1: ethylene-octene copolymer)
30 weight %

This resin composition was fed to a biaxial extruder and molten and kneaded at 250° C., and then extruded in a gat shape, cooled through a water bath at 20° C. and cut to a length of 3 mm with a chip cutter and subsequently dried 100° C. for two hours.

The results are listed in Tables 1 and 2. The resulting microporous film was excellent in film producibility as well as high in porosity and excellent in permeability. In addition, the film also had a high strength in the longitudinal direction and was excellent in handling properties.

Example 5

A microporous polypropylene film of a thickness of 20 μm fabricated in the same conditions as in Example 2 with the exception that, in place of polypropylene resin A, polypropylene-based resin C prepared by the composition below was fed to a uniaxial extruder was set to be the case of Example 5. In addition, the longitudinal stretching speed at this time was 30,000%/min and the transverse stretching speed was 1,750%/min.

<Polypropylene-Based Resin C>
Polypropylene: Polypropylene WF836DG3 (melt flow rate (MFR): 7 g/10 min) available from Sumitomo Chemical Co., Ltd.
91.8 weight %
High melt strength polypropylene having a long branched chain in a main chain: Polypropylene PF-814 (MFR: 3 g/10 min) available from Basell 3 weight %
β-Crystal Nucleating Agent:
N,N'-dicyclohexyl-2,6-naphthalene dicarboxamide (NU-100 available from New Japan Chemicals Co., Ltd.) 0.2 weight %
Polyolefin-based resin: "ENGAGE" 8411 available from "DuPont Dow Elastomers Japan" (mVLDPE1) 5 weight %

To 100 weight parts of this resin composition were added 0.15 weight part of IRGANOX1010 as an antioxidant available from Ciba-Geigy Ltd. and 0.1 weight part of IRGAFOS168 as a thermal stabilizer available from Ciba-Geigy Ltd. This was fed to a biaxial extruder and molten and kneaded at 300° C., and then extruded in a gat shape, cooled through a water bath at 20° C. and cut to a length of 3 mm with a chip cutter and subsequently dried 100° C. for two hours.

The results are listed in Tables 1 and 2. The resulting microporous film was excellent in film producibility as well as high in porosity and excellent in permeability. In addition, the film also had a high strength in the longitudinal direction and was excellent in handling properties.

Example 6

A microporous polypropylene film of a thickness of 20 μm fabricated in the same conditions as in Example 4 with the exception that a resin composition produced by mixing and addition in a ratio of 50 weight % of polypropylene resin A, 40 weight % of polypropylene-based resin D prepared by the composition below and 10 weight % of polypropylene-based resin B was fed to a uniaxial extruder was set to be the case of Example 6. In addition, the longitudinal stretching speed at this time was 30,000%/min and the transverse stretching speed was 1,750%/min.

<Polypropylene-Based Resin D>
Polypropylene: Polypropylene WF836DG3 (melt flow rate (MFR): 7 g/10 min) available from Sumitomo Chemical Co., Ltd.
99.8 weight %
β-Crystal Nucleating Agent:
N,N'-dicyclohexyl-2,6-naphthalene dicarboxamide (NU-100 available from New Japan Chemicals Co., Ltd.) 0.2 weight %

To 100 weight parts of this resin composition were added 0.15 weight part of IRGANOX1010 as an antioxidant available from Ciba-Geigy Ltd. and 0.1 weight part of IRGAFOS168 as a thermal stabilizer available from Ciba-Geigy Ltd. This was fed to a biaxial extruder and molten and kneaded at 300° C., and then extruded in a gat shape, cooled through a water bath at 20° C. and cut to a length of 3 mm with a chip cutter and subsequently dried 100° C. for two hours.

The results are listed in Tables 1 and 2. The resulting microporous film was excellent in film producibility as well as high in porosity and excellent in permeability. In addition, the film also had a high strength in the longitudinal direction and was excellent in handling properties.

Example 7

A microporous polypropylene film of a thickness of 20 μm fabricated in the same conditions as in Example 4 with the exception that the surface temperature of the cast drum was set at 110° C. was set to be the case of Example 7.

The results are listed in Tables 1 and 2. The resulting microporous film was excellent in film producibility as well as high in porosity and excellent in permeability. In addition, the film also had a high strength in the longitudinal direction and was excellent in handling properties.

Example 8

A microporous polypropylene film of a thickness of 20 μm fabricated in the same conditions as in Example 2 with the exception that, in place of polypropylene resin A, polypropylene-based resin E prepared by the composition below was fed to a uniaxial extruder was set to be the case of Example 8.
<Polypropylene-Based Resin E>
Polypropylene: Polypropylene WF836DG3 (melt flow rate (MFR): 7 g/10 min) available from Sumitomo Chemical Co., Ltd.
96.95 weight %
β-Crystal Nucleating Agent:
N,N'-dicyclohexyl-2,6-naphthalene dicarboxamide (NU-100 available from New Japan Chemicals Co., Ltd.) 0.05 weight %
High melt strength polypropylene having a long branched chain in a main chain: Polypropylene PF-814 (MFR: 3 g/10 min) available from Basell 3 weight %
To 100 weight parts of this resin composition were added 0.15 weight part of IRGANOX1010 as an antioxidant available from Ciba-Geigy Ltd. and 0.1 weight part of IRGAFOS168 as a thermal stabilizer available from Ciba-Geigy Ltd. This was fed to a biaxial extruder and molten and kneaded at 300° C., and then extruded in a gat shape, cooled through a water bath at 20° C. and cut to a length of 3 mm with a chip cutter and subsequently dried 100° C. for two hours.

The results are listed in Tables 1 and 2. The resulting microporous film was excellent in film producibility as well as high in porosity and excellent in permeability. In addition, the film also had a high strength in the longitudinal direction and was excellent in handling properties.

Example 9

In Example 4, a longitudinal uniaxial stretched film was sampled after stretching in the longitudinal direction and cooling. The resulting longitudinal uniaxial stretched film was cut to a rectangle of a size of 200 mm in the longitudinal direction and of 85 mm in the transverse direction. The resulting sample was transversely stretched by means of a film stretcher under the following conditions.
Device: KARO-IV (film stretcher) available from Brucker Maschinenbau GmbH.
Temperature conditions: In the following.
Stretching Oven: 135° C., Annealing 1 Oven: 155° C.
Stretching conditions: In the following. In addition, the cut-out film was set to the device such that the longitudinal direction of the film was made to correspond to the MD (machine direction) of the device.
MD: init1=195 mm, init2=182 mm
TD: init1=85 mm, init2=70 mm
Step 1: Mode: Heating, Position: Stretching Oven, Time: 15 sec
Step 2: Mode: Position, Position: Stretching Oven, MD: 1.00, 15%/sec, TD: 6.00, 15%/sec, Speed Mode: Constant Speed
Step 3: Mode: Position, Position: Annealing 1 Oven, MD: 1.00, 15%/sec, TD: 5.70, 15%/sec, Speed Mode: Constant Speed In addition, the above conditions correspond to that the longitudinal uniaxial stretched film is preheated at 135° C. for 15 seconds and then is stretched 6 times at 135° C. at 900%/min in the transverse direction and subsequently is heat treated at 155° C. while providing 5% of relaxation in the transverse direction. The resulting microporous polypropylene film of a thickness of 25 μm was set to be the case of Example 9.

The results are listed in Tables 1 and 2. The resulting microporous film was high in porosity as well as had an extremely large pore diameter and was excellent in permeability. In addition, the film also had a high strength in the longitudinal direction and was excellent in handling properties.

Example 10

In Example 4, instead of polypropylene resin A, polypropylene resin F prepared by the composition below was used. The amount of discharge of the molten polymer from an extruder was adjusted and then the transverse stretching temperature was set at 110° C. and the longitudinal stretching ratio was made to be 4 times to thereby sample a longitudinal uniaxial stretched film. A microporous polypropylene film of a thickness of 25 μm was produced, as in Example 9, by transversely stretching the resulting longitudinal uniaxial stretched film under the stretching conditions below (Example 10).
<Polypropylene Resin F>
Polypropylene: Polypropylene WF836DG3 (melt flow rate (MFR): 7 g/10 min) available from Sumitomo Chemical Co., Ltd.
99.8 weight %
β-Crystal Nucleating Agent:
N,N'-dicyclohexyl-2,6-naphthalene dicarboxamide (NU-100 available from New Japan Chemicals Co., Ltd.) 0.2 weight %
To 100 weight parts of this resin composition were added 0.15 weight part of IRGANOX1010 as an antioxidant available from Ciba-Geigy Ltd. and 0.1 weight part of IRGAFOS168 as a thermal stabilizer available from Ciba-Geigy Ltd. This was fed to a biaxial extruder and molten and kneaded at 300° C., and then extruded in a gat shape, cooled through a water bath at 20° C. and cut to a length of 3 mm with a chip cutter and subsequently dried 100° C. for two hours.
Temperature conditions: In the following.
Stretching Oven: 140° C., Annealing 1 Oven: 155° C.
Stretching conditions: In the following.
Step 1: Mode: Heating, Position: Stretching Oven, Time: 15 sec
Step 2: Mode: Position, Position: Stretching Oven, MD: 1.00, 10%/sec, TD: 6.00, 10%/sec, Speed Mode: Constant Speed
Step 3: Mode: Position, Annealing 1 Oven, MD: 1.00 10%/sec, TD: 5.70, 10%/sec, Speed Mode: Constant Speed In addition, the above conditions correspond to that the longitudinal uniaxial stretched film is preheated at 140° C. for 15 seconds and then is stretched 6 times at 140° C. at 600%/min in the transverse direction and subsequently is heat treated at 155° C. while providing 5% of relaxation in the transverse direction.

The results are listed in Tables 1 and 2. The resulting microporous film was high in porosity as well as had an extremely large pore diameter and was excellent in permeability. In addition, the film also had a high strength in the longitudinal direction and was excellent in handling properties.

Example 11

In Example 5, a longitudinal uniaxial stretched film was sampled after stretching in the longitudinal direction and cooling. A microporous polypropylene film of a thickness of 25 μm was produced, as in Example 9, by transverse stretching the resulting longitudinal uniaxial stretched film using a film stretcher under the stretching conditions below (Example 11).

Temperature conditions: In the following.
Stretching Oven: 140° C., Annealing 1 Oven: 155° C.
Stretching conditions: In the following.
Step 1: Mode: Heating, Position: Stretching Oven, Time: 15 sec
Step 2: Mode: Position, Position: Stretching Oven, MD: 1.00, 5%/sec, TD: 6.00, 5%/sec, Speed Mode: Constant Speed
Step 3: Mode: Position, Position Annealing 1 Oven, MD: 1.00 5%/sec, TD: 5.70, 5%/sec, Speed Mode: Constant Speed In addition, the above conditions correspond to that the longitudinal uniaxial stretched film is preheated at 140° C. for 15 seconds and then is stretched 6 times at 140° C. at 300%/min in the transverse direction and subsequently is heat treated at 155° C. while providing 5% of relaxation in the transverse direction.

The results are listed in Tables 1 and 2. The resulting microporous film was high in porosity as well as had an extremely large pore diameter and was excellent in permeability. In addition, the film also had a high strength in the longitudinal direction and was excellent in handling properties.

Example 12

In Example 2, a longitudinal uniaxial stretched film was sampled after stretching in the longitudinal direction and cooling. A microporous polypropylene film of a thickness of 25 μm that was produced under the conditions as in Example 10 by using the resulting longitudinal uniaxial stretched film using a film stretcher was set to be the case of Example 12.

The results are listed in Tables 1 and 2. The resulting microporous film was high in porosity as well as had an extremely large pore diameter and was excellent in permeability. In addition, the film also had a high strength in the longitudinal direction and was excellent in handling properties.

Example 13

In Example 5, a longitudinal uniaxial stretched film was sampled by use of polypropylene resin G prepared by the composition below in place of polypropylene resin C. A microporous polypropylene film of a thickness of 25 μm was produced under the conditions as in Example 11 by transverse stretching the resulting longitudinal uniaxial stretched film (Example 13).
<Polypropylene-Based Resin G>
Polypropylene: Polypropylene WF836DG3 (melt flow rate (MFR): 7 g/10 min) available from Sumitomo Chemical Co., Ltd.
 91.8 weight %
High melt strength polypropylene having a long branched chain in a main chain: Polypropylene PF-814 (MFR: 3 g/10 min) available from Basell 3 weight %
β-Crystal Nucleating Agent:
N,N'-dicyclohexyl-2,6-naphthalene dicarboxamide (NU-100 available from New Japan Chemicals Co., Ltd.) 0.2 weight %
Polyolefin-based resin: "ENGAGE" ENR7270 (mVLDPE2: ethylene/butane copolymer) 5 weight %

To 100 weight parts of this resin composition were added 0.15 weight part of IRGANOX1010 as an antioxidant available from Ciba-Geigy Ltd. and 0.1 weight part of IRGAFOS168 as a thermal stabilizer available from Ciba-Geigy Ltd. This was fed to a biaxial extruder and molten and kneaded at 300° C., and then extruded in a gat shape, cooled through a water bath at 20° C. and cut to a length of 3 mm with a chip cutter and subsequently dried 100° C. for two hours.

The results are listed in Tables 1 and 2. The resulting microporous film was high in porosity as well as had an extremely large pore diameter and was excellent in permeability. In addition, the film also had a high strength in the longitudinal direction and was excellent in handling properties.

Example 14

In Example 10, in place of 100 weight % of polypropylene resin F, a resin composition produced by adding and mixing in the ratio of 95 weight % of polypropylene-based resin F and 5 weight % of polypropylene-based resin B was used and the amount of discharge of its molten polymer from an extruder was adjusted and then a longitudinal uniaxial stretched film was sampled. A microporous polypropylene film of a thickness of 25 μm was produced, as in Example 9, by transverse stretching the resulting longitudinal uniaxial stretched film using a film stretcher under the stretching conditions below (Example 14).
Temperature conditions: In the following.
Stretching Oven: 140° C., Annealing 1 Oven: 155° C.
Stretching conditions: In the following.
Step 1: Mode: Heating, Position: Stretching Oven, Time: 15 sec
Step 2: Mode: Position, Position: Stretching Oven, MD: 1.00, 4%/sec, TD: 6.00, 4%/sec, Speed Mode: Constant Speed
Step 3: Mode: Position, Position Annealing 1 Oven, MD: 1.00, 4%/sec, TD: 5.70, 4%/sec, Speed Mode: Constant Speed In addition, the above conditions correspond to that the longitudinal uniaxial stretched film is preheated at 140° C. for 15 seconds and then is stretched 6 times at 140° C. at 240%/min in the transverse direction and subsequently is heat treated at 155° C. while providing 5% of relaxation in the transverse direction.

The results are listed in Tables 1 and 2. The resulting microporous film was high in porosity as well as had an extremely large pore diameter and was excellent in permeability. In addition, the film also had a high strength in the longitudinal direction and was excellent in handling properties.

Example 15

A microporous polypropylene film of a thickness of 25 μm fabricated in the same conditions as in Example 9 with the exception that, in place of polypropylene-based resin B, polypropylene-based resin H prepared by the composition below was used and the longitudinal stretching ratio was 4 times was set to be the case of Example 15.
<Polypropylene-Based Resin H>
Polypropylene: Polypropylene WF836DG3 (melt flow rate (MFR): 7 g/10 min) available from Sumitomo Chemical Co., Ltd.
 70 weight %
Polyolefin-based resin: "ENGAGE" 8100 available from "DuPont Dow Elastomers Japan" (mVLDPE3: ethylene-octene copolymer)
 30 weight %

This resin composition was fed to a biaxial extruder and molten and kneaded at 250° C., and then extruded in a gat shape, cooled through a water bath at 20° C. and cut to a length of 3 mm with a chip cutter and subsequently dried 100° C. for two hours.

The results are listed in Tables 1 and 2. The resulting microporous film was high in porosity as well as had an extremely large pore diameter and was excellent in permeability. In addition, the film also had a high strength in the longitudinal direction and was excellent in handling properties.

Example 16

In Example 3, a longitudinal uniaxial stretched film was sampled after stretching in the longitudinal direction and cooling. A microporous polypropylene film of a thickness of 25 μm was produced, as in Example 9, by transverse stretching the resulting longitudinal uniaxial stretched film using a film stretcher under the stretching conditions below (Example 16).
Temperature conditions: In the following.
Stretching Oven: 140° C., Annealing 1 Oven: 155° C.
Stretching conditions: In the following.
Step 1: Mode: Heating, Position: Stretching Oven, Time: 15 sec
Step 2: Mode: Position, Position: Stretching Oven, MD: 1.00, 2%/sec, TD: 6.00, 2%/sec, Speed Mode: Constant Speed
Step 3: Mode: Position, Position Annealing 1 Oven, MD: 1.00, 2%/sec, TD: 5.70, 2%/sec, Speed Mode: Constant Speed
In addition, the above conditions correspond to that the longitudinal uniaxial stretched film is preheated at 140° C. for 15 seconds and then is stretched 6 times at 140° C. at 120%/min in the transverse direction and subsequently is heat treated at 155° C. while providing 5% of relaxation in the transverse direction.
The results are listed in Tables 1 and 2. The resulting microporous film was high in porosity as well as had an extremely large pore diameter and was excellent in permeability. In addition, the film also had a high strength in the longitudinal direction and was excellent in handling properties.

Example 17

In Example 7, a longitudinal uniaxial stretched film was sampled after the longitudinal stretching ratio was made to be 4 times and stretching in the longitudinal direction was performed and the film was cooled. A microporous polypropylene film of a thickness of 25 μm was produced, as in Example 9, by transverse stretching the resulting longitudinal uniaxial stretched film under the stretching conditions below (Example 17).
Temperature conditions: In the following.
Stretching Oven: 135° C., Annealing 1 Oven: 155° C.
Stretching conditions: In the following.
Step 1: Mode: Heating, Position: Stretching Oven, Time: 15 sec
Step 2: Mode: Position, Position: Stretching Oven, MD: 1.00, 15%/sec, TD: 6.00, 15%/sec, Speed Mode: Constant Speed
Step 3: Mode: Position, Position Annealing 1 Oven, MD: 1.00, 15%/sec, TD: 5.70, 15%/sec, Speed Mode: Constant Speed
In addition, the above conditions correspond to that the longitudinal uniaxial stretched film is preheated at 135° C. for 15 seconds and then is stretched 6 times at 135° C. at 900%/min in the transverse direction and subsequently is heat treated at 155° C. while providing 5% of relaxation in the transverse direction.
The results are listed in Tables 1 and 2. The resulting microporous film was high in porosity as well as had an extremely large pore diameter and was excellent in permeability. In addition, the film also had a high strength in the longitudinal direction and was excellent in handling properties.

Comparative Example 1

Film production was attempted in the same conditions as in Example 1 with the exception that polypropylene resin D in place of polypropylene resin A was fed to a uniaxial extruder (Comparative Example 1).
The starting material characteristics and film characteristic evaluation results of the resulting microporous film are respectively shown in Tables 1 and 2. Because of frequent breakage during transverse stretching, the resulting film was not satisfied at all, with the film being industrially incapable of being produced.

Comparative Example 2

A microporous polypropylene film of a thickness of 20 μm produced under the same condition as in Comparative Example 1 with the exception that the material was stretched at 120° C. in the longitudinal direction and at 135° C. in the transverse direction was set to be the case of Comparative Example 2.
The results are shown in Tables 1 and 2. The resulting microporous film, as compared with the microporous film obtained in the above examples, was low in porosity as well as was also insufficient in permeability performance and also small in the pore diameter.

Comparative Example 3

Film production was attempted in the same conditions as in Comparative Example 2 with the exception that the stretching ratio in the longitudinal direction was made to be 5 times (Comparative Example 3).
The results are indicated in Tables 1 and 2. Because of sporadic breakage during transverse stretching, the resulting film was not satisfied, with the film being industrially incapable of being produced.

Comparative Example 4

Film production was attempted in the same conditions as in Comparative Example 3 with the exception that the stretching ratio in the longitudinal direction was made to be 6 times (Comparative Example 4).
The results are shown in Tables 1 and 2. Because of frequent breakage during longitudinal and transverse stretching, a satisfactory film was not able to be obtained at all, with the film being industrially incapable of being produced.

Comparative Example 5

A microporous polypropylene film of a thickness of 20 μm fabricated in the same conditions as in Comparative Example 2 with the exception that, in place of polypropylene resin D, polypropylene-based resin I prepared by the composition below was fed to a uniaxial extruder was set to be the case of Comparative Example 5.
<Polypropylene Resin I>
Polypropylene: Polypropylene WF836DG3 (melt flow rate (MFR): 7 g/10 min) available from Sumitomo Chemical Co., Ltd.
99.95 weight %
β-Crystal Nucleating Agent:
N,N'-dicyclohexyl-2,6-naphthalene dicarboxamide (NU-100 available from New Japan Chemicals Co., Ltd.) 0.05 weight %
To 100 weight parts of this resin composition were added 0.15 weight part of IRGANOX1010 as an antioxidant available from Ciba-Geigy Ltd. and 0.1 weight part of IRGAFOS168 as a thermal stabilizer available from Ciba- Geigy Ltd. This was fed to a biaxial extruder and molten and kneaded at 300° C., and then extruded in a gat shape, cooled through a water bath at 20° C. and cut to a length of 3 mm with a chip cutter and subsequently dried 100° C. for two hours.

The results are indicated in Tables 1 and 2. The resulting microporous film was low in porosity, insufficient in permeability performance and small in pore diameter as compared with the microporous film obtained in the above examples.

Comparative Example 6

A microporous polypropylene film of a thickness of 20 μm fabricated in the same conditions as in Comparative Example 2 with the exception that the surface temperature of the cast drum was set at 125° C., and that the material was stretched 4 times at 90° C. in the longitudinal direction and stretched 4 times at 120° C. in the transverse direction was set to be the case of Comparative Example 6.

The results are shown in Tables 1 and 2. The resulting microporous film, probably due to a low stretching ratio in the transverse direction, was low in porosity, insufficient in permeability performance and small in pore diameter as compared with the microporous film obtained in the above examples. In addition, probably due to transverse stretching at low temperature, the film sporadically broke.

Comparative Example 7

In Comparative Example 1, polypropylene resin J prepared by the composition below in place of polypropylene resin D was fed to a uniaxial extruder and an attempt was made to contact the resulting material with a metal drum for 10 minutes. Although the cast speed was made to be the lower limit, the site (landing point) on which a sheet extruded from the die landed on the cast drum was not a constant place and deviated, whereby a non-stretched sheet was substantially incapable of being formed. The maintenance of the non-stretched sheet on the drum for 10 minutes, although the cast speed was set to be the lower limit, needed to practically use a cast drum having a diameter of 5 m or further larger, and thus was absolutely unrealistic.
<Polypropylene Resin J>
Polypropylene: Polypropylene WF836DG3 (melt flow rate (MFR): 7 g/10 min) available from Sumitomo Chemical Co., Ltd.
99.96 weight %
β-Crystal Nucleating Agent:
N,N'-dicyclohexyl-2,6-naphthalene dicarboxamide (NU-100 available from New Japan Chemicals Co., Ltd.) 0.04 weight %
To 100 weight parts of this resin composition were added 0.15 weight part of IRGANOX1010 as an antioxidant available from Ciba-Geigy Ltd. and 0.1 weight part of IRGAFOS168 as a thermal stabilizer available from Ciba-Geigy Ltd. This was fed to a biaxial extruder and molten and kneaded at 300° C., and then extruded in a gat shape, cooled through a water bath at 20° C. and cut to a length of 3 mm with a chip cutter and subsequently dried 100° C. for two hours.

Now, next, in Comparative Example 1, the above polypropylene resin J instead of polypropylene resin D was fed to a uniaxial extruder and the contact time with a metal drum was set to be 40 seconds to thereby sample a non-stretched sheet. Thereafter, immediately the non-stretched sheet was heat retained for 10 minutes in a hot air oven heated and kept at 120° C. and then the roll was again introduced into a longitudinal stretching machine and attempts were made to stretch the sheet 6 times at 105° C. in the longitudinal direction and 8 times at 155° C. in the transverse direction (Comparative Example 7).

The results are shown in Tables 1 and 2. The heat treatment in the oven extremely worsened the non-stretched sheet in its flat properties and, because of frequent breakage during longitudinal and transverse stretching, a satisfactory film was not able to be obtained at all, with the film being industrially incapable of being produced.

Comparative Example 8

Film production was attempted under the same conditions as in Comparative Example 7 with the exception that the longitudinal stretching ratio was made to decrease 4 times (Comparative Example 8).

The results are shown in Tables 1 and 2. Because of frequent breakage during longitudinal and transverse stretching, a satisfactory film was not able to be obtained at all, with the film being industrially incapable of being produced.

Comparative Example 9

The polypropylene-based resin K having the composition below was prepared.
<Polypropylene-Based Resin K>
Polypropylene: Polypropylene WF836DG3 (melt flow rate (MFR): 7 g/10 min) available from Sumitomo Chemical Co., Ltd.
94.95 weight %
β-Crystal Nucleating Agent:
N,N'-dicyclohexyl-2,6-naphthalene dicarboxamide (NU-100 available from New Japan Chemicals Co., Ltd.) 0.05 weight % Polymethylpentene: Polymethylpentene "TPX" RT-18 available from Mitsui Chemicals, Inc. 0.5 weight %

This resin composition was fed to a biaxial extruder and molten and kneaded at 280° C., and then extruded in a gat shape, cooled through a water bath at 20° C. and cut to a length of 3 mm with a chip cutter and subsequently dried 100° C. for two hours.

The chip of the resulting polypropylene-based resin K was fed to a uniaxial extruder and molten and kneaded at 280° C., passed through a single plate filter of 400 mesh and then extruded from a slit-shaped die heated to 200° C. and cast to a drum the surface temperature of which was heated to 120° C., and formed in a sheet shape while the resin was affixed by blowing heat air heated to 120° C. from the non-drum face side of a film using an air knife to obtain a non-stretched sheet. In addition, the contact time with the metal drum was 40 sec at this time.

The resulting non-stretched sheet was preheated by passing through a group of rolls kept at 120° C. and passed through between rolls being kept at 120° C. having different rotating speeds and subsequently stretched 4 times at 120° C. in the longitudinal direction and cooled to 30° C. Subsequently, this longitudinal stretched film was introduced into a tenter while both the ends of it was pinched with a clip, and preheated at 135° C. and then stretched 8 times at 135° C. in the transverse direction. Next, the film was heat fixed at 150° C. while being given 5% of relaxation in the transverse direction in the tenter and uniformly gradually cooled and then cooled to room temperature. After corona discharge treatment of both the faces in the air and the film was rolled up to obtain a microporous polypropylene film of a thickness of 25 μm.

The results are shown in Tables 1 and 2. In the film production step, probably due to the low affinity of polypropylene for polymethylpentene, polymethylpentene was dropped from the film and affixed, for example, onto the stretching roll as a white powder. Because of this, sporadic breakage of the film was caused. In addition, such dropped white powder might possibly be a cause of increasing the internal resistance when the present film was processed as a separator for a cell, so the present film was unable to be substantially used as a separator.

Comparative Example 10

A commercially available "CELGARD" 2500 available from Celgard was made to be the case of Comparative Example 10. Additionally, a "Celgard" 2500 is a microporous polypropylene film produced by use of the lamellae-stretching technique.

The results are shown in Tables 1 and 2. The resulting microporous film is a uniaxially oriented film and was low in porosity as compared with the microporous films of the above examples. Moreover, the longitudinal orientation of the crystal chains were too high and thus exhibited easily torn properties in the longitudinal direction.

Comparative Example 11

Film production was attempted in the same conditions as in Example 3 with the exception that the polypropylene resin L prepared by the composition below in place of polypropylene resin A was fed to a uniaxial extruder (Comparative Example 11).

<Polypropylene Resin L>
Polypropylene: Polypropylene WF836DG3 (melt flow rate (MFR): 7 g/10 min) available from Sumitomo Chemical Co., Ltd.
94.8 weight %
β-Crystal Nucleating Agent:
N,N'-dicyclohexyl-2,6-naphthalene dicarboxamide (NU-100 available from New Japan Chemicals Co., Ltd.) 0.2 weight %
Acrylic modified high molecular weight polytetrafluoroethylene: "METABLEN" A type (A-3000) available from Mitsui Rayon Co., Ltd. 5 weight %

This resin composition was fed to a biaxial extruder and molten and kneaded at 250° C., and then extruded in a gat shape, cooled through a water bath at 20° C. and cut to a length of 3 mm with a chip cutter and subsequently dried 100° C. for two hours.

The results are indicated in Tables 1 and 2. Because a gelled substance was deposited on the non-stretched sheet and frequent breakage during longitudinal and transverse stretching was caused, the resulting film was not satisfied at all, with the film being industrially incapable of being produced.

TABLE 1

| | Resin composition | | | | | |
|---|---|---|---|---|---|---|
| | | β-Crystal nucleating agent composition | | Added resin, additive | | |
| | Mixture proportion of HMS-PP (weight %) | β-Crystal nucleating agent or β-Crystal nucleating agent added PP | Mixture proportion (weight %) | Resin name | Mixture proportion (weight %) | CD temperature (° C.) |
| Example 1 | 3 | NU-100 | 0.2 | — | — | 120 |
| Example 2 | 3 | NU-100 | 0.2 | — | — | 120 |
| Example 3 | 3 | NU-100 | 0.2 | — | — | 120 |
| Example 4 | 2.7 | NU-100 | 0.18 | mVLDPE1 | 3 | 120 |
| Example 5 | 3 | NU-100 | 0.2 | mVLDPE1 | 5 | 120 |
| Example 6 | 1.5 | NU-100 | 0.18 | mVLDPE1 | 3 | 120 |
| Example 7 | 2.7 | NU-100 | 0.18 | mVLDPE1 | 3 | 110 |
| Example 8 | 3 | NU-100 | 0.05 | — | — | 120 |
| Example 9 | 2.7 | NU-100 | 0.18 | mVLDPE1 | 3 | 120 |
| Example 10 | 0 | NU-100 | 0.18 | mVLDPE1 | 3 | 120 |
| Example 11 | 3 | NU-100 | 0.2 | mVLDPE1 | 5 | 120 |
| Example 12 | 3 | NU-100 | 0.2 | — | — | 120 |
| Example 13 | 3 | NU-100 | 0.2 | mVLDPE2 | 5 | 120 |
| Example 14 | 0 | NU-100 | 0.19 | mVLDPE1 | 1.5 | 120 |
| Example 15 | 2.7 | NU-100 | 0.18 | mVLDPE3 | 3 | 120 |
| Example 16 | 3 | NU-100 | 0.2 | — | — | 120 |
| Example 17 | 2.7 | NU-100 | 0.18 | mVLDPE1 | 3 | 110 |
| Comparative Example 1 | — | NU-100 | 0.2 | — | — | 120 |
| Comparative Example 2 | — | NU-100 | 0.2 | — | — | 120 |
| Comparative Example 3 | — | NU-100 | 0.2 | — | — | 120 |
| Comparative Example 4 | — | NU-100 | 0.2 | — | — | 120 |
| Comparative Example 5 | — | NU-100 | 0.05 | — | — | 120 |
| Comparative Example 6 | — | NU-100 | 0.2 | — | — | 125 |
| Comparative Example 7 | — | NU-100 | 0.04 | — | — | 120 |
| Comparative Example 8 | — | NU-100 | 0.04 | — | — | 120 |
| Comparative Example 9 | — | NU-100 | 0.05 | PMP | 5 | 120 |

TABLE 1-continued

| | | | | | | |
|---|---|---|---|---|---|---|
| Comparative Example 10 | — | — | — | — | — | — |
| Comparative Example 11 | — | NU-100 | 0.2 | A-3000 | 5 | 120 |

| | Longitudinal stretching temperature (° C.) | Transverse stretching temperature (° C.) | Stretching ratio [longitudinal direction × transverse direction] | Stretching speed (%/min) Longitudinal stretching | Transverse stretching | Film producibility (number of breakages) |
|---|---|---|---|---|---|---|
| Example 1 | 105 | 140 | 4 × 8 | 18000 | 1400 | A<Zero> |
| Example 2 | 105 | 140 | 5 × 8 | 30000 | 1750 | A<Zero> |
| Example 3 | 105 | 140 | 6 × 8 | 45000 | 2100 | B<1 time> |
| Example 4 | 100 | 135 | 5 × 8 | 30000 | 1750 | A<Zero> |
| Example 5 | 105 | 140 | 5 × 8 | 30000 | 1750 | A<Zero> |
| Example 6 | 100 | 135 | 5 × 8 | 30000 | 1750 | A<Zero> |
| Example 7 | 100 | 135 | 5 × 8 | 30000 | 1750 | B<1 time> |
| Example 8 | 105 | 140 | 5 × 8 | 30000 | 1750 | A<Zero> |
| Example 9 | 100 | 135 | 5 × 6 | 30000 | 900 | — |
| Example 10 | 110 | 140 | 4 × 6 | 18000 | 600 | — |
| Example 11 | 105 | 140 | 5 × 6 | 30000 | 300 | — |
| Example 12 | 105 | 140 | 5 × 6 | 30000 | 600 | — |
| Example 13 | 105 | 140 | 5 × 6 | 30000 | 300 | — |
| Example 14 | 110 | 140 | 4 × 6 | 18000 | 240 | — |
| Example 15 | 100 | 135 | 4 × 6 | 18000 | 900 | — |
| Example 16 | 105 | 140 | 6 × 6 | 45000 | 120 | — |
| Example 17 | 100 | 135 | 4 × 6 | 18000 | 900 | — |
| Comparative Example 1 | 105 | 140 | (4 × —) | (18000) | — | D<12 times> |
| Comparative Example 2 | 120 | 135 | 4 × 8 | 18000 | 1400 | B<1 time> |
| Comparative Example 3 | 120 | 135 | (5 × 8) | (30000) | (1750) | D<4 times> |
| Comparative Example 4 | 120 | 135 | (6 × —) | (45000) | — | D<20 times> |
| Comparative Example 5 | 120 | 135 | 4 × 8 | 18000 | 1400 | A<Zero> |
| Comparative Example 6 | 90 | 120 | 4 × 4 | 18000 | 600 | C<2 times> |
| Comparative Example 7 | 105 | 155 | 6 × — | 45000 | — | D<20 times> |
| Comparative Example 8 | 105 | 155 | 4 × — | 18000 | — | D<2Zero> |
| Comparative Example 9 | 120 | 135 | 4 × 8 | 18000 | 1400 | C<2 times> |
| Comparative Example 10 | — | — | — | — | — | — |
| Comparative Example 11 | 105 | 140 | (6 × —) | (45000) | — | D<20 times> |

HMS-PP: High melt strength polypropylene
mVLDPE1, 2, 3: Ultralow density polyethylene using metallocene
PMP: Polymethylpentene
CD: Cast drum
A-3000: Acrylic modified high molecular weight polytetrafluoroethylene

TABLE 2

| | Porosity (%) | Strength at 25° C. in longitudinal direction (MPa) | Average pore diameter (nm) | Anuclear pore | β-Crystal activity | β-Crystal content (%) | I(MD)/I(TD) | Gurley permeability (sec/100 ml) | Handling properties |
|---|---|---|---|---|---|---|---|---|---|
| Example 1 | 69 | 58 | 45 | Yes | Yes | 69 | 0.93 | 230 | Yes |
| Example 2 | 76 | 61 | 45 | Yes | Yes | 69 | 1.75 | 150 | Yes |
| Example 3 | 80 | 62 | 47 | Yes | Yes | 69 | 4.50 | 100 | Yes |
| Example 4 | 79 | 59 | 53 | Yes | Yes | 64 | 2.11 | 110 | Yes |
| Example 5 | 81 | 55 | 55 | Yes | Yes | 62 | 2.57 | 90 | Yes |
| Example 6 | 80 | 57 | 53 | Yes | Yes | 67 | 2.40 | 110 | Yes |
| Example 7 | 73 | 63 | 52 | Yes | Yes | 64 | 1.89 | 180 | Yes |
| Example 8 | 72 | 64 | 43 | Yes | Yes | 60 | 1.68 | 200 | Yes |
| Example 9 | 81 | 59 | 62 | Yes | Yes | 64 | 2.32 | 90 | — |

TABLE 2-continued

| | Porosity (%) | Strength at 25° C. in longitudinal direction (MPa) | Average pore diameter (nm) | Anuclear pore | β-Crystal activity | β-Crystal content (%) | I(MD)/I(TD) | Gurley permeability (sec/100 ml) | Handling properties |
|---|---|---|---|---|---|---|---|---|---|
| Example 10 | 78 | 50 | 71 | Yes | Yes | 70 | 1.04 | 100 | — |
| Example 11 | 84 | 53 | 88 | Yes | Yes | 62 | 2.66 | 40 | — |
| Example 12 | 80 | 57 | 59 | Yes | Yes | 69 | 1.91 | 65 | — |
| Example 13 | 83 | 55 | 94 | Yes | Yes | 62 | 2.39 | 35 | — |
| Example 14 | 86 | 47 | 101 | Yes | Yes | 72 | 1.23 | 25 | — |
| Example 15 | 75 | 52 | 61 | Yes | Yes | 64 | 1.53 | 160 | — |
| Example 16 | 85 | 60 | 84 | Yes | Yes | 69 | 4.86 | 30 | — |
| Example 17 | 72 | 54 | 61 | Yes | Yes | 64 | 1.93 | 150 | — |
| Comparative Example 1 | — | — | — | — | — | — | — | — | — |
| Comparative Example 2 | 64 | 60 | 43 | Yes | Yes | 79 | 0.48 | 270 | Yes |
| Comparative Example 3 | — | — | — | — | — | — | — | — | — |
| Comparative Example 4 | — | — | — | — | — | — | — | — | — |
| Comparative Example 5 | 62 | 61 | 42 | Yes | Yes | 77 | 0.45 | 280 | Yes |
| Comparative Example 6 | 55 | 72 | 40 | Yes | Yes | 79 | 0.47 | 580 | Yes |
| Comparative Example 7 | — | — | — | — | — | — | — | — | — |
| Comparative Example 8 | — | — | — | — | — | — | — | — | — |
| Comparative Example 9 | 68 | 71 | 50 | No | Yes | 71 | 0.42 | 320 | Yes |
| Comparative Example 10 | 55 | 95 | — | Yes | No | 0 | 8.96 | 230 | Yes |
| Comparative Example 11 | — | — | — | — | — | — | — | — | — |

I(MD): X-ray intensity of film in longitudinal direction
I(TD): X-ray intensity of film in transverse direction

Example 18

The microporous film obtained in Example 3 was directly used for a separator of the present invention to thereby fabricate a lithium ion cell as an electric storage device of the present invention using the method indicated (20) above.

The resulting lithium ion cell indicated extremely excellent cell characteristics including an internal resistance of 36 mΩ, a cycle characteristic C of 86%, and a rate characteristic R of 48%.

Example 19

The microporous film obtained in Example 11 was directly used by means of the method indicated in (20) above of the present invention to thereby fabricate a lithium ion cell as an electric storage device of the present invention.

The resulting lithium ion cell indicated extremely excellent cell characteristics including an internal resistance of 30 mΩ, a cycle characteristic C of 81%, and a rate characteristic R of 67%.

Comparative Example 12

The microporous film obtained in Comparative Example 12 was directly used to fabricate a lithium ion cell as in Example 18 above.

The resulting lithium ion cell was inferior to the cell obtained in the examples above, at an external resistance of 41 mΩ, a cycle characteristic C of 78%, and a rate characteristic R of 29%.

Tables 1 and 2 show that a microporous film for an electric storage device separator of the present invention of the present invention exhibited a remarkable high porosity and high permeability, whereby a cell using the film as a separator was low in internal resistance, excellent in rate characteristic and also excellent in cycle properties. In addition, characteristics such as the porosity, the strength in a longitudinal direction, the orientation state, the average pore size, and permeability were capable of being controlled by starting material formulation and film production conditions.

In particular, lowering a stretching speed in one direction enabled the average pore size of the resulting film to be extremely increased. The use of a microporous film for the electric storage device separator as a separator made it possible to further make excellent the characteristics of the above described cell (internal resistance, rate characteristic, cycle characteristic).

INDUSTRIAL APPLICATION

A microporous film for an electric storage device separator of the present invention is preferably used as a high performance separator exhibiting good ion electroconductivity, while basic separation performance is maintained, not only in a lithium ion cell illustrated above but in other primary cells and secondary cells as well as capacitors such as an electric double-layer capacitor and an electrolyte condenser.

The invention claimed is:

1. A microporous film for an electric storage device separator comprising polypropylene as a primary component and an ultra low density polyethylene, having a porosity of 70% or more, a strength of 40 MPa or more in a longitudinal direction, an average pore size of from 40 to 400 nm, anuclear pores, and exhibiting biaxial orientation.

2. The microporous film for an electric storage device separator of claim 1, comprising 1 to 10% by weight of the ultra low density polyethylene.

3. The microporous film for an electric storage device separator of claim 1, exhibiting β-crystal activity.

4. The microporous film for an electric storage device separator of claim 1, satisfying the equation below in an azimuthal intensity distribution profile in the plane of film of the (−113) face by means of X-ray diffraction:

$$0.5 \leq I(MD)/I(TD) \leq 8 \tag{1}$$

wherein I(MD) is an integration intensity in a longitudinal direction and I(TD) is an integration intensity in a transverse direction.

5. The microporous film for an electric storage device separator of claim 1, having a Gurley permeability of 400 sec/100 ml or less.

6. The microporous film for an electric storage device separator of claim 1, wherein the average pore size is 52 nm or more.

7. An electric storage device separator using the microporous film of claim 1.

8. An electric storage device comprising:
 the electric storage device separator of claim 7, an anode, a cathode and an electrolyte solution.

9. The electric storage device of claim 8, characterized in that
 the electric storage device comprises a lithium ion cell.

10. The electric storage device of claim 8, characterized in that
 the electric storage device comprises an electrolyte condenser.

11. The electric storage device of claim 8, characterized in that
 the electric storage device comprises an electric double-layer capacitor.

12. The microporous film for an electric storage device separator of claim 1, wherein the microporous film does not contain poly(methyl methacrylate).

* * * * *